United States Patent
Wei et al.

(10) Patent No.: US 9,961,673 B2
(45) Date of Patent: May 1, 2018

(54) METHOD AND APPARATUS FOR EFFICIENT USAGE OF DAI BITS FOR EIMTA IN LTE

(71) Applicant: QUALCOMM Incorporated, San Diego, CA (US)

(72) Inventors: Chao Wei, Beijing (CN); Neng Wang, Beijing (CN); Peng Cheng, Beijing (CN); Wanshi Chen, San Diego, CA (US); Hao Xu, San Diego, CA (US); Peter Gaal, San Diego, CA (US); Jilei Hou, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/916,173

(22) PCT Filed: Nov. 1, 2013

(86) PCT No.: PCT/CN2013/086436
§ 371 (c)(1),
(2) Date: Mar. 2, 2016

(87) PCT Pub. No.: WO2015/043042
PCT Pub. Date: Apr. 2, 2015

(65) Prior Publication Data
US 2016/0198450 A1    Jul. 7, 2016

(30) Foreign Application Priority Data
Sep. 26, 2013    (WO) ................ PCT/CN2013/084339

(51) Int. Cl.
*H04W 72/04*    (2009.01)
*H04L 1/00*    (2006.01)
(Continued)

(52) U.S. Cl.
CPC .......... *H04W 72/0406* (2013.01); *H04L 1/00* (2013.01); *H04L 1/1812* (2013.01);
(Continued)

(58) Field of Classification Search
None
See application file for complete search history.

(56) References Cited

U.S. PATENT DOCUMENTS 9,391,743 B2 * 7/2016 Han ................... H04L 1/1812
9,584,242 B2 * 2/2017 Li ..................... H04W 72/12
(Continued)

FOREIGN PATENT DOCUMENTS

CN    102904698 A    1/2013
WO    2012149673 A1    11/2012

OTHER PUBLICATIONS

International Search Report and Written Opinion—PCT/CN2013/084339—ISA/EPO—Jun. 24, 2014.
(Continued)

*Primary Examiner* — Hong Cho
(74) *Attorney, Agent, or Firm* — Arent Fox, LLP

(57) ABSTRACT

A method, an apparatus, and a computer program product for wireless communication are provided. The apparatus receives, by a user equipment (UE) during a first subframe, an indication of a dynamic uplink/downlink (UL/DL) subframe configuration. The apparatus determines an uplink hybrid automatic repeat request (HARQ) timing based on an uplink reference subframe configuration and at least one of the dynamic UL/DL subframe configuration or a downlink reference subframe configuration. The apparatus selects an uplink subframe for communication based on the determined uplink HARQ timing.

24 Claims, 16 Drawing Sheets

(51) Int. Cl.
H04W 72/02 (2009.01)
H04L 1/18 (2006.01)
H04L 5/22 (2006.01)
H04W 72/14 (2009.01)

(52) U.S. Cl.
CPC .............. *H04L 1/1887* (2013.01); *H04L 5/22* (2013.01); *H04W 72/02* (2013.01); *H04W 72/14* (2013.01)

(56) References Cited

U.S. PATENT DOCUMENTS

| | | | | |
|---|---|---|---|---|
| 9,602,250 | B2* | 3/2017 | Xu | H04L 1/1812 |
| 2011/0280164 | A1 | 11/2011 | Luo et al. | |
| 2012/0127897 | A1* | 5/2012 | Xu | H04L 1/1887 |
| | | | | 370/279 |
| 2012/0230273 | A1* | 9/2012 | He | H04L 1/1887 |
| | | | | 370/329 |
| 2013/0114474 | A1 | 5/2013 | Fu et al. | |
| 2013/0194981 | A1 | 8/2013 | Wang et al. | |
| 2013/0242816 | A1 | 9/2013 | He et al. | |
| 2013/0242824 | A1 | 9/2013 | Lee et al. | |
| 2013/0286901 | A1* | 10/2013 | Yuan | H04L 1/1854 |
| | | | | 370/279 |
| 2014/0050125 | A1* | 2/2014 | Zhang | H04J 3/1694 |
| | | | | 370/280 |

OTHER PUBLICATIONS

International Search Report and Written Opinion—PCT/CN2013/086436—ISA/EPO—May 5, 2014.

Itri: "Signalling mechanism and HARQ timeline for TDD eIMTA," 3GPP Draft; R1-131074 Signalling Mechanism and HARQ Timeline for—Tdd EIMTA_R1_Clean; 3rd Generation Partnership Project(3GPP), Mobile Competence Centre; vol. RAN WG1, no. Chicago, USA; Apr. 15, 2013-Apr. 19, 2013; Apr. 5, 2013, XP050696735, pp. 1-4, Retrieved from the Internet: URL:http://www.3gpp.org/ftp/tsg_ran/WG1_RL1/TSGR1_72b/Docs/ [retrieved on Apr. 5, 2013].
NEC Group: "HARQ-timing for TDD eIMTA system," 3GPP Draft; R1-133340; HARQ-Timing, 3rd Generation Partnership Project (3GPP), Mobile Competence Centre; ; Sophia-Antipolis Cedex; France, vol. RAN WG1, no. Barcelona, Spain; Aug. 19, 2013-Aug. 23, 2013; Aug. 10, 2013 (Aug. 10, 2013), XP050716460, pp. 1-3, Retrieved from the Internet: URL:http://www.3gpp.org/ftp/tsg_ran/WG1_RL1/TSGR1_74/Docs/ [retrieved on Aug. 10, 2013].
Supplementary European Search Report—EP13894901—Search Authority—The Hague—Sep. 13, 2017.
CMCC: "Discussion on HARQ timeline for TDD eIMTA", 3GPP TSG-RAN WG1#74 R1-133520, URL:http://www.3gpp.org/ftp/tsg_ran/WG1_RL1/TSGR1_74/Docs/R1-133520.zip, Aug. 10, 2013.
Itri: "HARQ Timeline for TDD eIMTA", 3GPP TSG-RAN WG1#74 R1-133315, URL:http://www.3gpp.org/ftp/tsg_ran/WG1_RL1/TSGR1_74/Docs/R1-133315.zip, Aug. 9, 2013.
NTT DOCOMO: "HARQ Design for eIMTA", 3GPP TSG-RAN WG1#74 R1-133451, URL:http://www.3gpp.org/ftp/tsg_ran/WG1_RL1/TSGR1_74/Docs/R1-133451.zip, Aug. 10, 2013.
Qualcomm Incorporated: "HARQ Design for TDD UL-DL Reconfiguration", 3GPP TSG-RAN WG1#74 R1-133583, URL:http://www.3gpp.org/ftp/tsg_ran/WG1_RL1/TSGR1_74/Docs/R1-133583.zip, Aug. 10, 2013.

* cited by examiner

METHOD AND APPARATUS FOR EFFICIENT USAGE OF DAI BITS FOR EIMTA IN LTE

CROSS-REFERENCE TO RELATED APPLICATION(S)

This application claims the benefit of Chinese PCT Application Serial No. PCT/CN2013/084339, entitled "METHOD AND APPARATUS FOR EFFICIENT USAGE OF DAI BITS FOR eIMTA IN LTE" and filed on Sep. 26, 2013, and Chinese PCT Application Serial No. PCT/CN2013/086436, entitled "METHOD AND APPARATUS FOR EFFICIENT USAGE OF DAI BITS FOR eIMTA IN LTE" and filed on Nov. 1, 2013, which are expressly incorporated by reference herein in their entirety.

BACKGROUND

Field

The present disclosure relates generally to communication systems, and more particularly, to uplink and downlink operations.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus (e.g., user equipment (UE)) are provided. The UE receives an indication of a dynamic uplink/downlink (UL/DL) subframe configuration during a first subframe (SF). The UE determines an uplink hybrid automatic repeat request (HARQ) timing based on an uplink reference subframe configuration and at least one of the dynamic UL/DL subframe configuration or a downlink reference subframe configuration. The UE selects an uplink subframe for communication based on the determined uplink HARQ timing.

The UE may select the uplink subframe for communication based on the determined uplink HARQ timing by determining an uplink index based on the dynamic UL/DL subframe configuration, where the uplink subframe is selected based on the uplink index. The uplink index may be a first value when the dynamic UL/DL subframe configuration indicates one or more subframe numbers are associated with a subframe for uplink, and the uplink index may be a second value when the dynamic UL/DL subframe configuration indicates the one or more subframe numbers are not associated with the subframe for uplink. The UE may further receive downlink control information (DCI), and may further interpret a field in the DCI as the uplink index when the determined uplink HARQ reference configuration is a UL/DL subframe configuration and the dynamic UL/DL subframe configuration is the UL/DL subframe configuration. In another aspect, the UE may interpret the field in the DCI as an uplink DAI when at least one of the determined uplink HARQ reference configuration or the dynamic UL/DL subframe configuration is not the UL/DL subframe configuration.

The UE may receive an uplink grant in a last downlink subframe of a downlink association set of the selected uplink subframe, wherein the last downlink subframe is determined based on the downlink reference subframe configuration. The last downlink subframe of the downlink association set may be located subsequent to a fixed downlink subframe used to receive another uplink grant. The UE may select one of the uplink grant from the last downlink subframe of the downlink association set or the other uplink grant from the fixed downlink subframe based on at least one of a time of decoding the uplink grant and a time of decoding the other uplink grant, or an indicator in the dynamic UL/DL subframe configuration.

In another aspect of the disclosure, a further method, computer program product, and apparatus (e.g., user equipment (UE)) are provided. The UE determines at least one of a parameter for a hybrid automatic repeat request (HARQ) message bundling or a HARQ message codebook. In an aspect, the parameter for the HARQ message bundling may be determined based on a size of a downlink association set of subframes detected by a user equipment, and the HARQ message codebook may be determined based on at least one of the size of the downlink association set of subframes or a size of a dynamic set of subframes excluding one or more flexible uplink subframes. The UE transmits one or more HARQ messages based on at least one of the parameter or the HARQ message codebook. The one or more flexible uplink subframes may be determined from a dynamic uplink/downlink subframe configuration.

DETAILED DESCRIPTION

Figure 1:
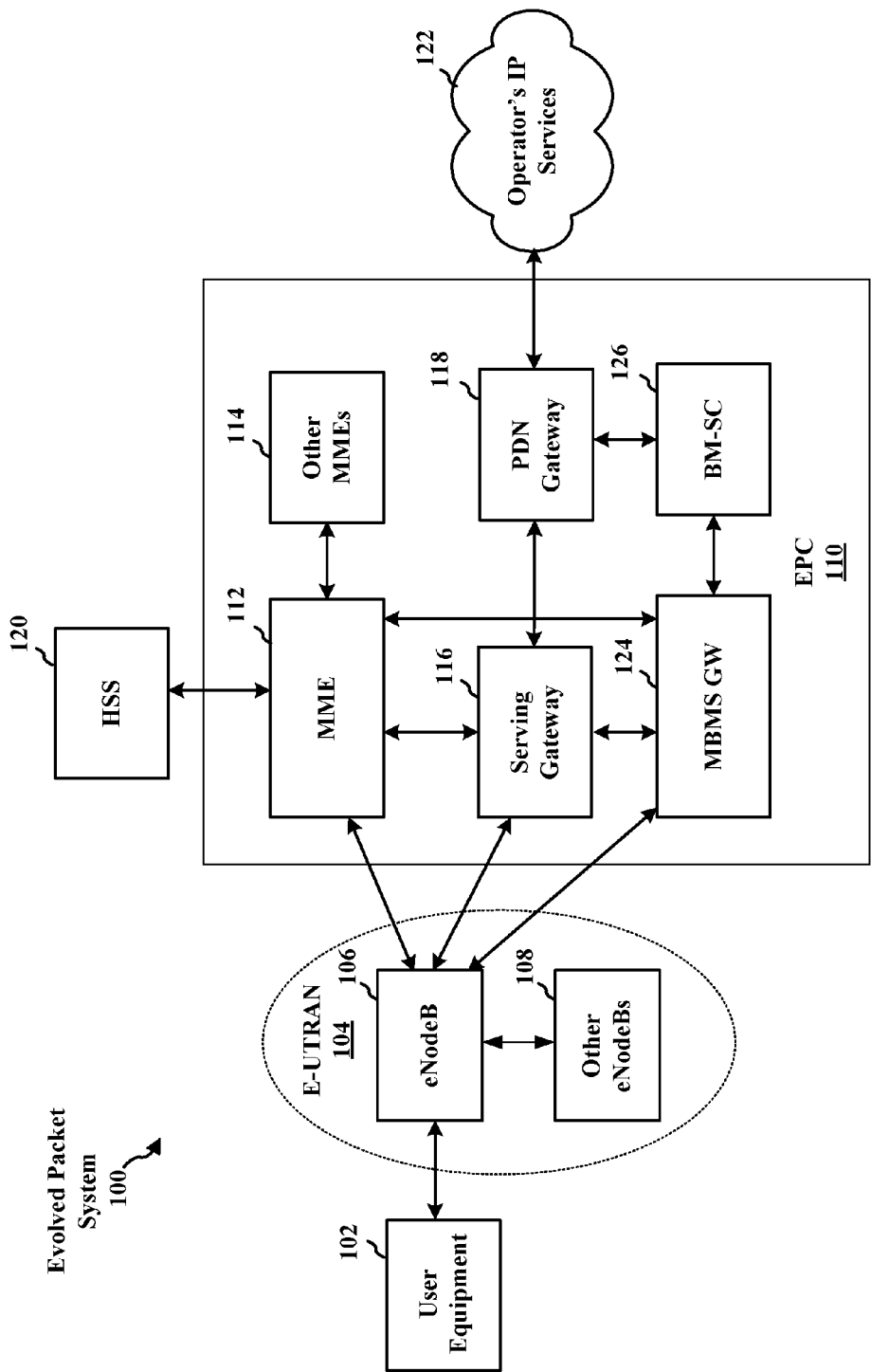
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
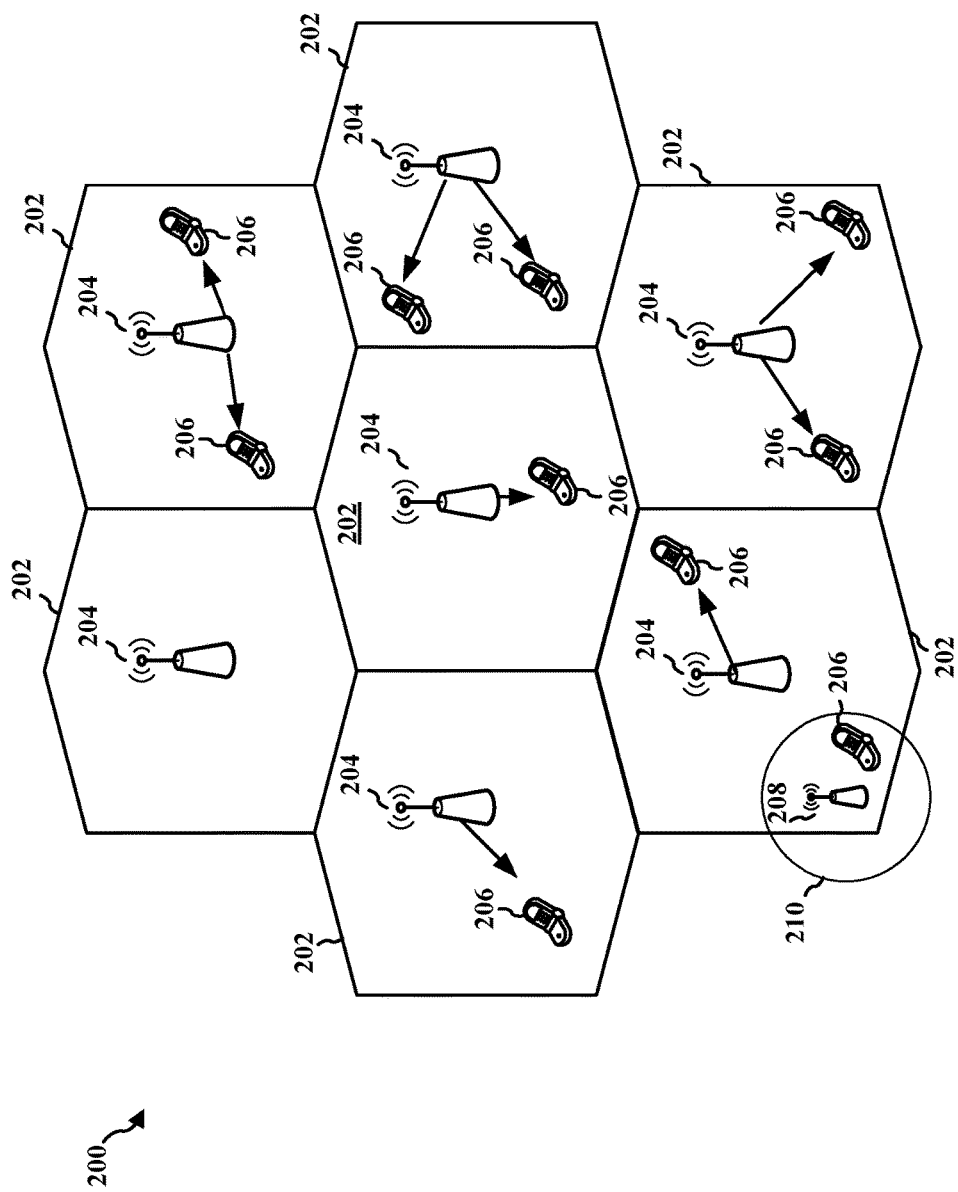
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
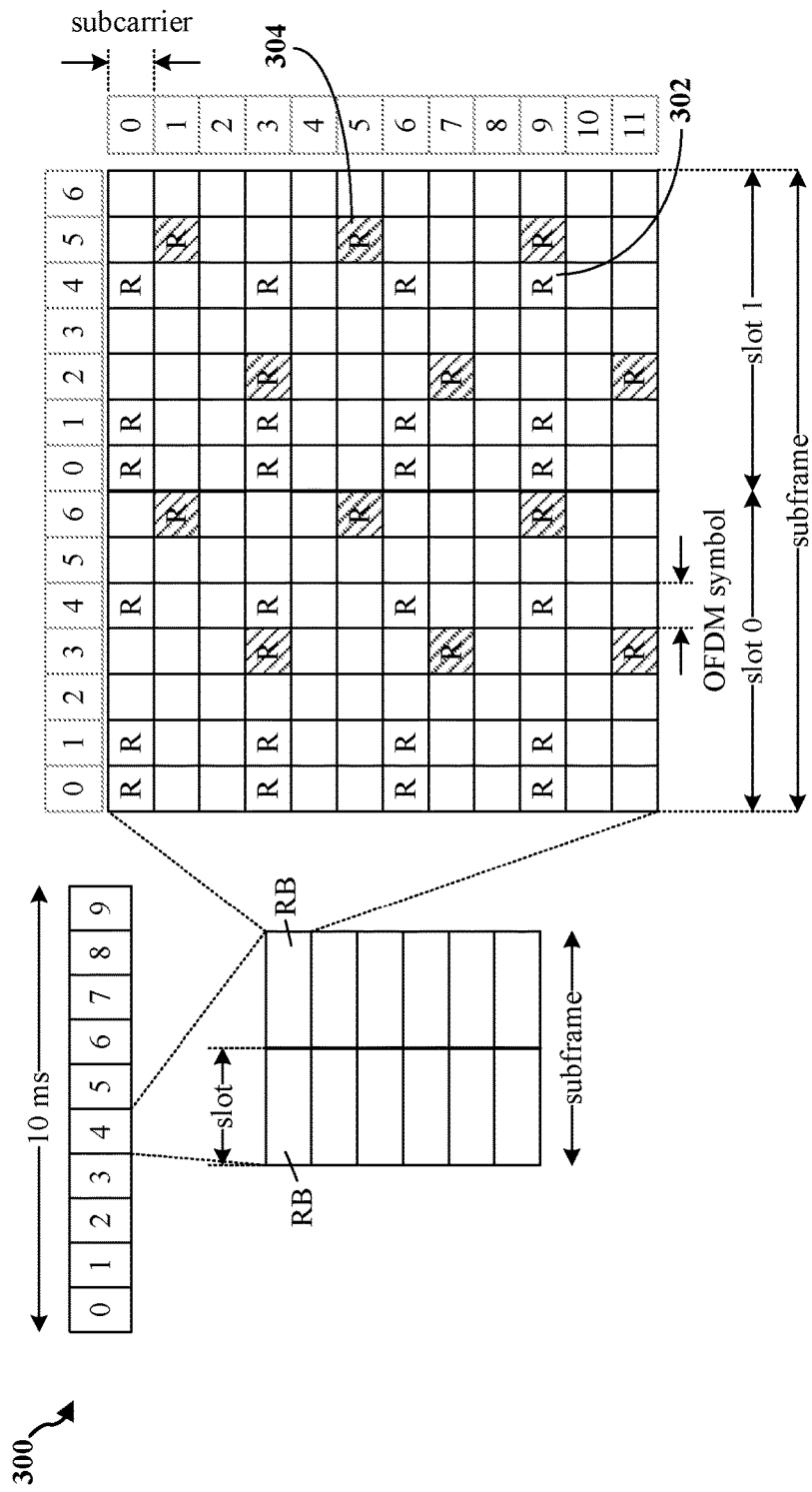
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
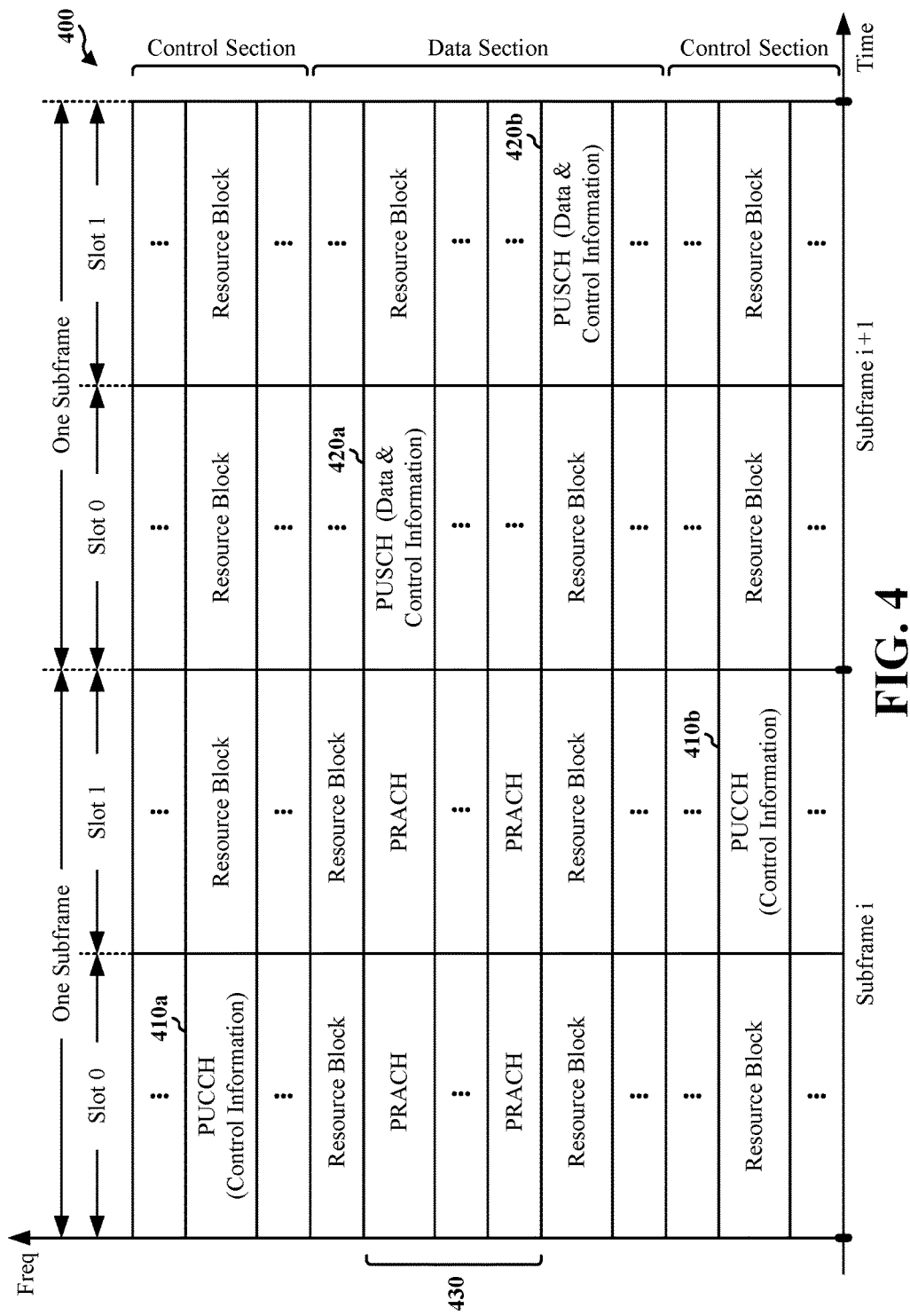
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
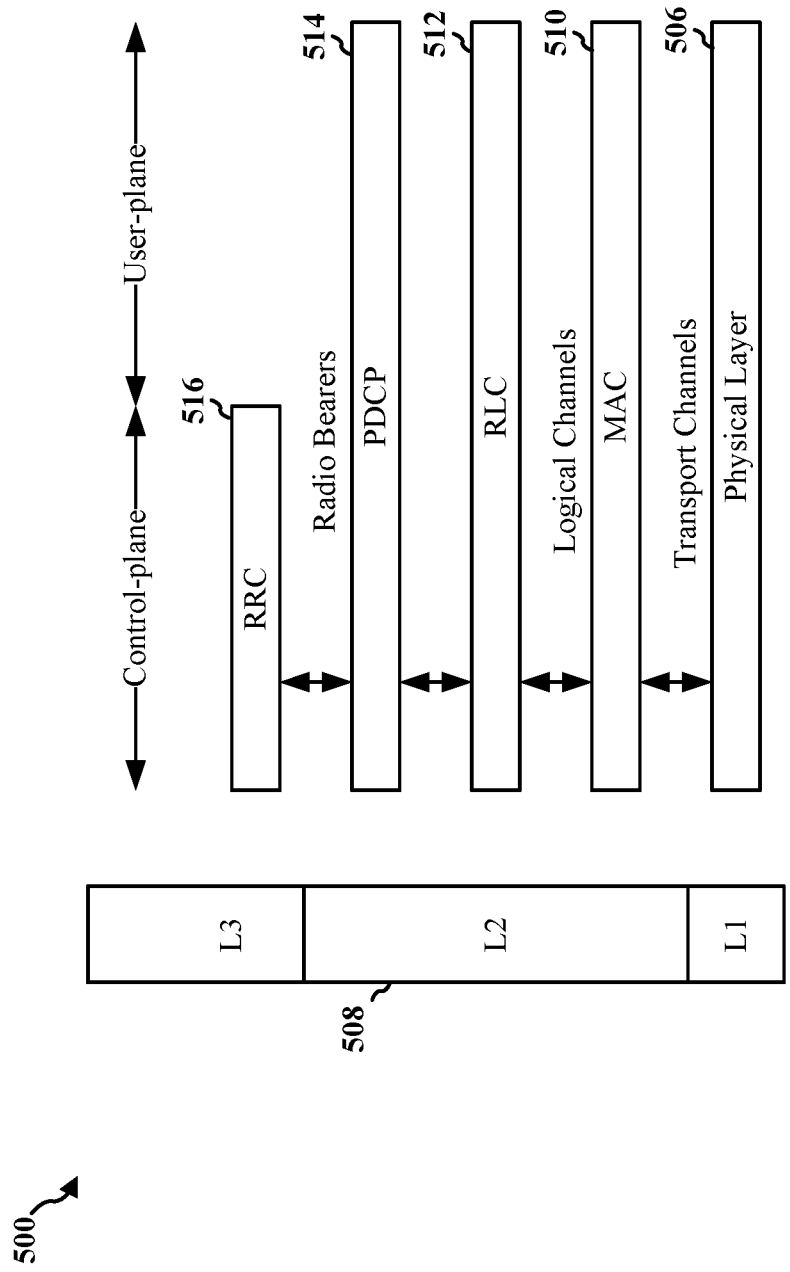
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
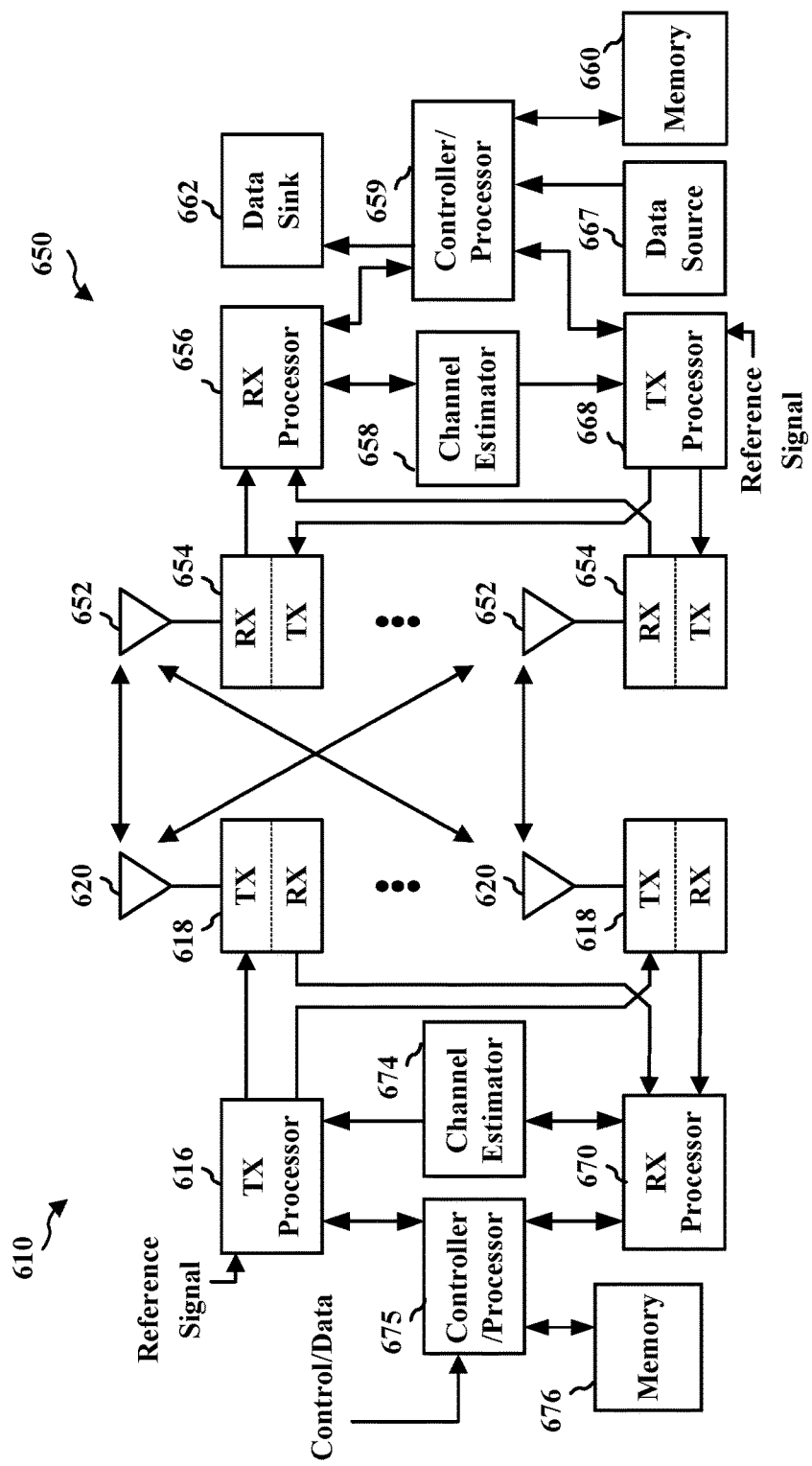
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
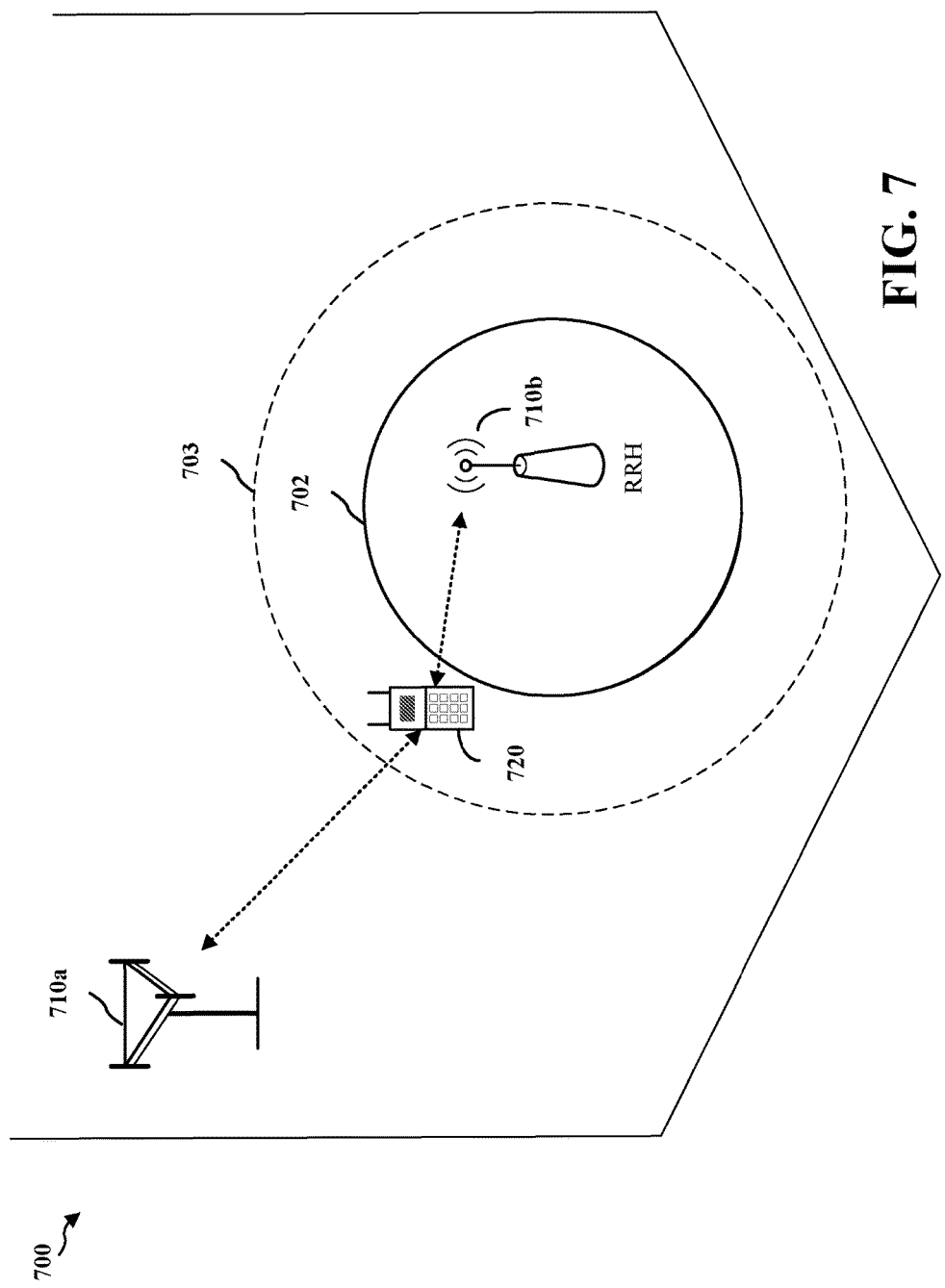
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancellation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

As discussed supra, in LTE applications, OFDM is used on the DL and SC-FDMA is used on the UL to support both FDD and TDD. For TDD, there may be seven possible UL and DL (UL/DL) subframe configurations. For example, based on the subframe configurations, each of the subframes may be utilized for uplink or downlink or as a special subframe. Examples of the subframe configurations are illustrated in Table 1 below.

TABLE 1

Uplink-downlink configurations

| Uplink-downlink Config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 8:
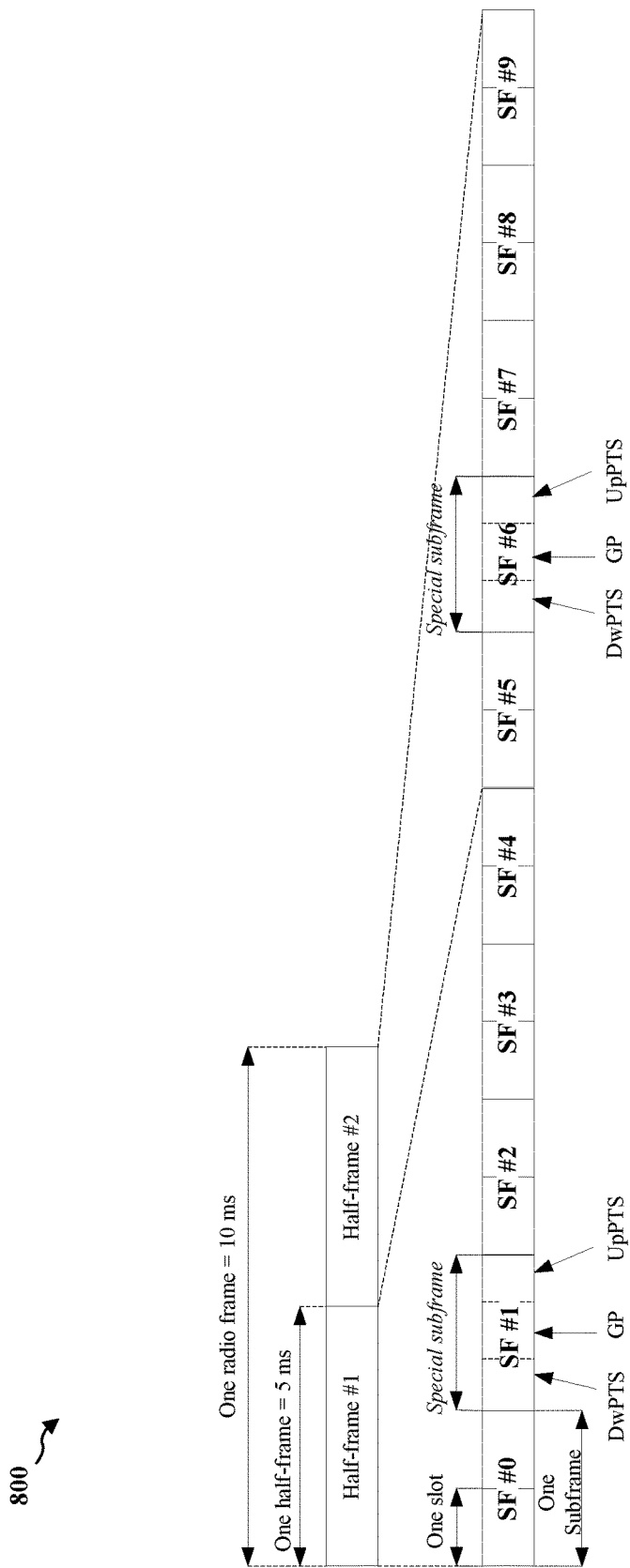
FIG. 8 is a radio frame structure for a TDD physical layer.

FIG. 8 is a radio frame structure 800 for a TDD physical layer. There may be two switching periodicities, 5 ms and 10 ms. For the switching periodicity of 5 ms, there are two special subframes in one radio frame, where one radio frame is 10 ms. For the switching periodicity of 10 ms, there is one special subframe in one radio frame. As illustrated in FIG. 8, one radio frame may be 10 ms, and may include two "half-frames" having periodicity of 5 ms. Each half-frame includes five subframes. In the example illustrated in FIG. 8, Half-frame #1 includes subframes #0-4 (e.g., SF #0-4), and Half-frame #2 includes subframes #5-9 (e.g., SF #5-9). In each half-frame, each of four of the five subframes may include two slots, and one of the five subframes may be a special subframe including three fields: downlink pilot time slot (DwPTS), guard period (GP), and uplink pilot time slot (UpPTS). In the example illustrated in FIG. 8, for Half-frame #1, each of SF #0, 2, 3, and 4 includes two slots, and SF #1 is a special subframe including DwPTS, GP, and UpPTS. For Half-frame #2, each of SF #5, 7, 8, and 9 includes two slots, and SF #6 is a special subframe including DwPTS, GP, and UpPTS. The special subframe is used when switching from DL to UL, whereas no special subframe is used when switching from UL to DL.

Enhanced Interference Management and Traffic Adaptation (eIMTA) (see, e.g., 3GPP Rel-12) provides a mechanism that allows dynamic adaptation of the TDD DL/UL subframe configurations based on traffic needs. That is, eIMTA may allow dynamic switching from one DL/UL subframe configuration to another DL/UL subframe configuration depending on an amount of UL traffic and/or DL traffic. If there is heavy DL traffic, an eNB using the eIMTA may switch a current subframe configuration to another subframe configuration that has more subframes for DL than the current subframe configuration. For example, if a data burst on DL is expected and the current subframe configuration is configuration #1 having four DL subframes and four UL subframes (4 DL:4 UL), the eNB may switch the subframe configuration from subframe configuration #1 to configuration #5 having eight DL subframes and one UL subframe (8 DL:1 UL). On the other hand, if there is heavy UL traffic, the eNB using the eIMTA may switch a current subframe configuration to another subframe configuration that has more subframes for UL than the current subframe configuration. For example, if a large data burst on UL is expected and the current subframe configuration is configuration #5 having eight DL subframes and one UL subframe (8 DL:1 UL), the eNB may switch the subframe configuration from subframe configuration #5 to configuration #0 having two DL subframes and six UL subframes (2 DL:6 UL). The eNB may perform the adaptation of the TDD UL/DL subframe configuration (e.g., switching the subframe configuration) in 640 ms, for example. In an aspect, the eNB may perform the adaptation of the TDD UL/DL subframe configuration in as quickly as 10 ms.

Use of eIMTA may cause interference to DL and UL when two or more cells have different DL and UL subframes. In particular, because the traffic needs for each cell may be different, different subframe configurations may be used for different cells depending on the traffic needs for the different cells. For example, if cell A switches to subframe configuration #1 and cell B switches to subframe configuration #5, configuration #1 uses subframes 3, 7, and 8 for UL while configuration #5 uses subframes 3, 7, and 8 for DL, which may cause the UE (e.g., the UE 102) to suffer an interference. Further, use of eIMTA may cause some complexity in DL and UL HARQ timing management. In particular, currently each of the DL/UL subframe configurations may have its own DL/UL HARQ timing that is optimized (in terms of HARQ operation efficiency) for the DL/UL subframe configuration. For example, the UL/DL HARQ timing from a PDSCH DL transmission to a corresponding HARQ ACK/NAK UL transmission may vary among different TDD DL/UL subframe configurations. With dynamic switching among the TDD DL/UL subframe configurations (e.g., among the subframe configurations of Table 1), if DL/UL HARQ timing is maintained according to a first subframe configuration before switching to a second subframe configuration, there would be missed ACK/NAK transmission opportunities for some of the DL or UL transmissions because the UL/DL HARQ timing for the first subframe configuration before switching may be different for the second subframe configuration after switching.

To simplify the operations for the eIMTA, one or more DL/UL subframe configurations may be defined as reference configurations for several physical layer operations. A DL reference subframe configuration may be defined based on one of the subframe configurations and a UL reference subframe configuration may be defined based on another one of the subframe configurations, such that the DL reference subframe configuration is used for DL HARQ operations and the UL reference subframe configuration is used for UL HARQ operations. For example, with regard to a DL reference subframe configuration design, DL HARQ operations may be based on DL/UL subframe configuration #5, regardless of an actual DL/UL subframe configuration in use in a frame (or half a frame). That is, if dynamic DL/UL subframe configuration is enabled, the DL HARQ timing may be based on the subframe configuration #5 with eight DL subframes and one UL subframe (e.g., a 8:1 DL/UL subframe configuration). With regard to a UL reference subframe configuration design, a UL HARQ operation can be based on DL/UL subframe configuration #0, regardless of an actual DL/UL subframe configuration in use in a frame (or half a frame). That is, if dynamic DL/UL subframe configuration is enabled, the UL HARQ timing may be based on the subframe configuration #0 with two DL subframes and six UL subframes (e.g., a 2:6 DL/UL subframe configuration).

Figure 9:
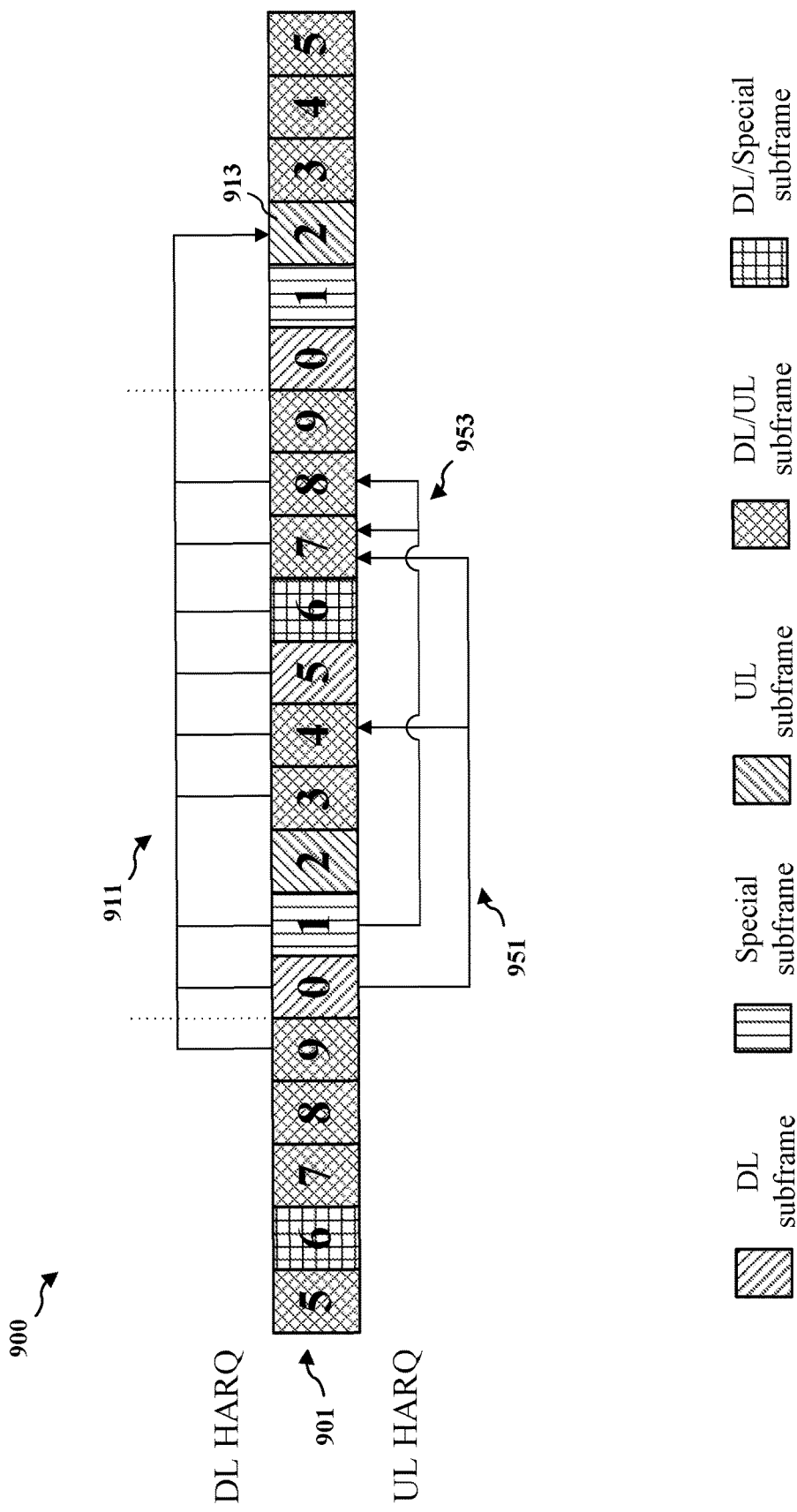
FIG. 9 is an example HARQ operation of a DL HARQ operation and a UL HARQ operation with subframes according to DL and UL reference subframe configurations

FIG. 9 is an example HARQ operation 900 of a DL HARQ operation and a UL HARQ operation with subframes 901 according to DL and UL reference subframe configurations. In the example illustrated in FIG. 9, the DL reference subframe configuration utilizes subframe configuration #5 for the DL HARQ operation and the UL reference subframe configuration utilizes subframe configuration #0 for the UL HARQ operation. Thus, subframes #0 and 5 are fixed as DL subframes for both the DL and UL HARQ operations, subframe #1 is fixed as a special subframe for both the DL and UL HARQ operations, and subframe #2 is fixed as a UL subframe for both the DL and UL HARQ operations. Each of subframes #3, 4, 7, 8, and 9 is a DL/UL subframe that is used as a UL subframe or a DL subframe depending on whether the operation is the DL HARQ operation or the UL HARQ operation. In particular, subframes #3, 4, 7, 8, and 9 are used as DL subframes for the DL HARQ operation based on the subframe configuration #5, and subframes #3, 4, 7, 8, and 9 are used as UL subframes for the UL HARQ operation based on the subframe configuration #0. Subframe #6 is a DL/Special subframe that is used as a DL subframe or a special subframe depending on whether the operation is the DL HARQ operation or the UL HARQ operation. As illustrated in FIG. 9, during a first DL HARQ operation 911, the UE may receive DL data at subframes #9, 0, 1, 3, 4, 5, 6, 7, and 8 and may transmit an UL response at subframe #2 (913). Further, as illustrated in FIG. 9, during a first UL HARQ operation 951, the UE may receive DL data at subframes #0 and transmit associated UL information at subframes #4 and 7. During a second UL HARQ operation 953, the UE may receive DL data at subframe 1 and transmit associated UL information at subframes #7 and 8.

In TDD, the UE may receive a specific 2-bit field in downlink control information (DCI) format 0/4 during a downlink communication at a DL subframe. Usage of the 2-bit field in the DCI format 0/4 depends on the TDD DL/UL subframe configuration. If the TDD UL/DL subframe configuration is subframe configuration #0, the 2-bit field is used as a UL index to determine a delay between a Physical Downlink Control Channel (PDCCH) UL grant and a PUSCH data transmission. Table 2 illustrates an example of a UL index that determines scheduling of PUSCH transmission. For example, according to Table 2, if the UE receives a PDCCH UL grant at SF0, the UE may perform the PUSCH transmission at SF4 if the UL index is "10" and at SF7 if the UL index is "01." Thus, a delay between the PDCCH UL grant and the PUSCH transmission is four subframes for the UL index of "10" and seven subframes for the UL index of "01." In a case where the UL index is "11," multi-Transmission Time Interval (muti-TTI) scheduling is performed at multiple subframes. For example, if the UL index is "11" and the UE receives the UL grant at SF0, the UE performs PUSCH transmission at both SF4 and SF7. In Table 2, n is a subframe number to receive the UL grant subframe, and k is a value from a lookup table which assigns a specific value for each UL grant subframe number.

TABLE 2

PDCCH subframes and PUSCH subframes based on a UL index

| PDCCH | PUSCH Subframe | | |
|---|---|---|---|
| UL Grant Subframe | UL index = "10" (n + k) | UL index = "01" (n + 7) | UL index = "11" |
| SF0 | SF4 | SF7 | SF4 and SF7 |
| SF1 | SF7 | SF8 | SF7 and SF8 |
| SF5 | SF9 | SF2 | SF9 and SF2 |
| SF6 | SF2 | SF3 | SF2 and SF3 |

If TDD UL/DL subframe configuration is one of subframe configurations #1-6, the two bits in the 2-bit field are used as UL downlink assignment index (DAI) bits to indicate a total number of scheduled DL subframes with PDSCH transmission in a DL association set, which is utilized by the UE to determine $N_{bundled}$ parameter for HARQ-ACK bundling or HARQ-ACK codebook size for HARQ-ACK multiplexing. For example, as illustrated in FIG. 9, nine DL subframes (e.g., subframes #9, 0, 1, 3, 4, 5, 6, 7, and 8) may be available in the DL association set for UL at subframe #2. Then, a total number of DL subframes in the DL association set for UL at subframe #2 may be nine or less. As one example, a total number of DL subframes in the DL association set is three if only subframes #9, 0 and 1 are used for DL.

As discussed supra, the reference subframe configuration used for UL HARQ timing may be different from the reference subframe configuration used for DL HARQ timing. If subframe configuration #0 is used as the UL HARQ reference subframe configuration, the 2-bit field in the DCI format 0/4 for subframe configuration #0 may be used for the UL index. In such an aspect, because the 2-bit field in the DCI format 0/4 cannot be used as both the UL index and the UL DAI, collision between the UL index and the UL DAI bits in the DCI format 0/4 may occur. For example, if the 2-bit field in the DCI format 0/4 is used as the UL index to determine the delay between the PDCCH UL grant and PUSCH transmission, then there is no UL DAI in the DCI format 0/4 to indicate a total number of scheduled DL subframes with PDSCH transmission in the DL association set. With the absence of the UL DAI, the UE may not be able to determine the total number of scheduled DL subframes in the DL association set, and thus may not be able to determine $N_{bundled}$ parameter for HARQ-ACK bundling or HARQ-ACK codebook size for HARQ-ACK multiplexing. Therefore, the absence of the UL DAI may result in UL HARQ-ACK transmission ambiguity. On the other hand, for example, if subframe #5 is used as the DL HARQ reference subframe configuration, the 2-bit field in the DCI format 0/4 for subframe configuration #5 may be used for the UL DAI bits. If the 2-bit field is used as the UL DAI field and not as the UL index, then the UE may not be able to determine the UL index to determine the delay between the PDCCH UL grant and the PUSCH data transmission.

Another issue may arise in a situation where the DL subframe carrying DCI format 0/4 is not in the last subframe of the DL association set. The last subframe of the DL association set is a subframe with the smallest value of km, where km is a minimum delay between the PDCCH UL grant and the PUSCH transmission. If PDCCH UL grant transmission is based on UL HARQ reference subframe configuration, the DL subframe carrying DCI format 0/4 may not be in the last subframe of the DL association set.

Figure 10:
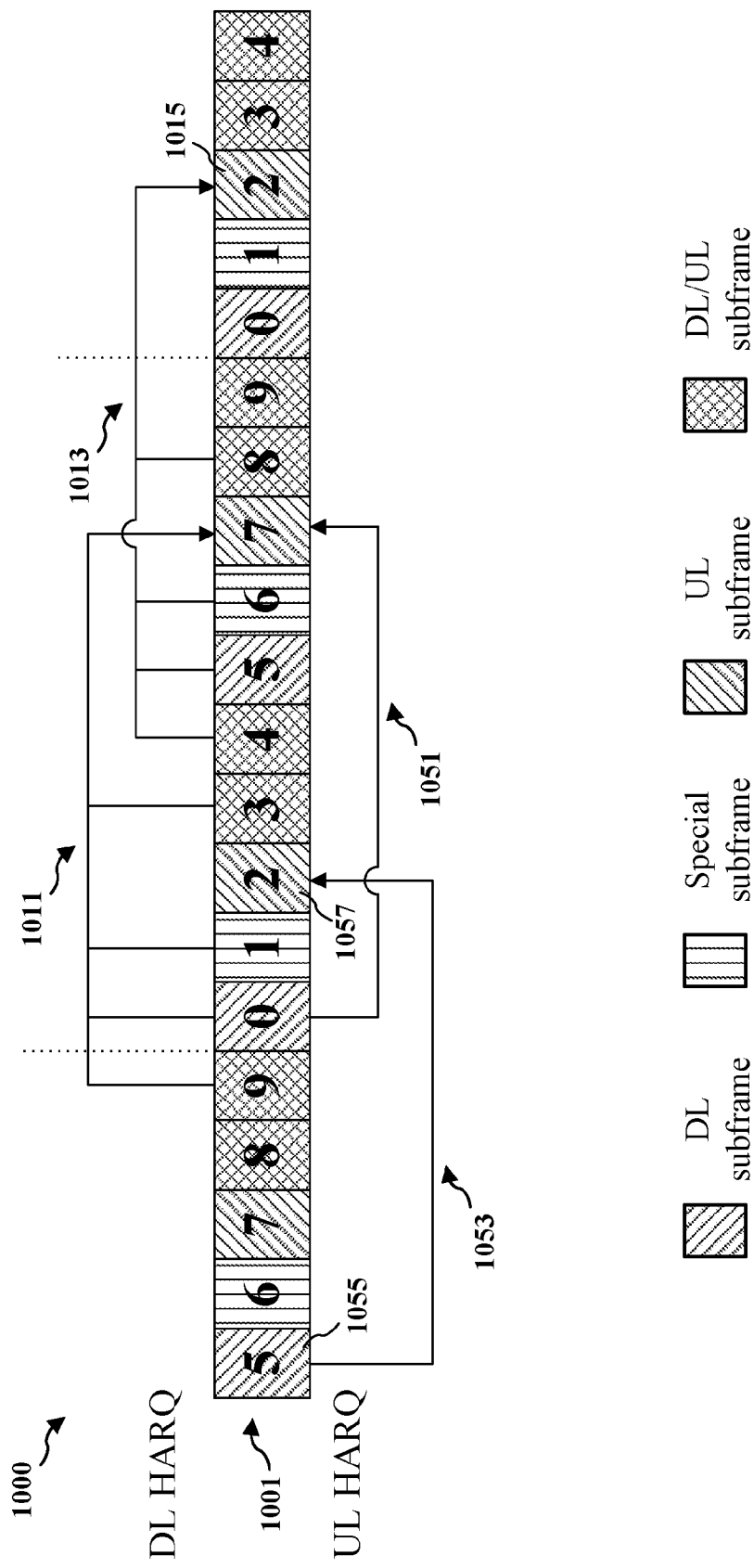
FIG. 10 is another example HARQ operation of a DL HARQ operation and a UL HARQ operation with subframes according to DL and UL reference subframe configurations.

FIG. 10 is another example HARQ operation 1000 of a DL HARQ operation and a UL HARQ operation with subframes 1001 according to DL and UL reference subframe configurations. In the example illustrated in FIG. 10, subframe configuration #2 is used as a DL reference subframe configuration and subframe configuration #6 is used as a UL reference subframe configuration. Thus, subframe #0 is fixed as a DL subframe for both the DL and UL HARQ operations, subframes #2 and 7 are fixed as UL subframes for both the DL and UL HARQ operations, and subframes #1 and 6 are fixed special subframes for both the DL and UL HARQ operations. Each of subframes #3, 4, 8, and 9 is a flexible DL/UL subframe that is used as a UL subframe or a DL subframe depending on whether the operation is the DL HARQ operation or the UL HARQ operation.

In FIG. 10, with regard to the DL HARQ timing, a first DL HARQ operation 1011 illustrates that the DL association set includes subframes #9, 0, 1, and 3 for UL at subframe #7, and the second DL HARQ operation 1013 illustrates that the DL association set includes subframes #4, 5, 6 and 8 for UL at subframe #2 (1015). With regard to the UL HARQ timing, a first UL HARQ operation 1051 illustrates that the UE receives a UL grant (e.g., DCI format 0/4) at subframe #0 for UL at subframe #7, and a second UL HARQ operation 1053 illustrates that the UE receives another UL grant at subframe #5 (1055) for UL at subframe #2 (1057). For the DL association set for subframe #7, the last subframe of the DL association is subframe #3. Thus, the minimum delay between the PDCCH UL grant and the PUSCH transmission is between subframe #3 and subframe #7. However, although the UE receives the UL grant at subframe #0 for UL at subframe #7, subframe #0 is not the last subframe of the DL association set for subframe #7. In this case, there may be an issue with regard to the UL DAI bits that indicate a total number of scheduled DL subframes with PDSCH transmission in the DL association set. In particular, in this case, the eNB (e.g., eNB 106) has no scheduling for UL grant transmission at subframes #1 and 3, and thus cannot provide a correct value for the UL DAI bits for the UL grant transmitted at subframe #0. As a result, eNB has to use pre-scheduling for DL subframes (e.g., subframes #1 and 3) following the UL grant subframe (e.g., subframe #0) when transmitting the UL grant for UL at subframe #7, which generates additional restriction for a DL scheduler and may create complexity.

The potential collision between the UL index and the UL DAI bits may be addressed with a first approach using a cell specific UL index configuration (instead of using a UE specific UL index configuration). In the first approach with the cell specific UL index configuration, the UL index is not included in the DCI format 0/4 of a UL grant, and thus the 2-bit field in the DCI format 0/4 may be used for the UL DAI bits. Instead of including the UL index in the 2-bit field in the DCI format 0/4, the UL index may be configured based on dynamic TDD UL/DL configuration. Because the 2-bit field in the DCI format 0/4 of the UL grant is not used for the UL index, the 2-bit field in the DCI format 0/4 may be used for the UL DAI. Further, in the first approach, only two values of UL index (e.g., "0" and "1") are applied to all UL grants.

In the example illustrated in Tables 3A and 3B where subframe configuration #0 is used as the UL HARQ reference subframe configuration, only two values of UL index, "0" and "1," are defined for the eIMTA and are applied to UL grants. As illustrated in the Tables 3A and 3B below, the UL grant subframe and the PUSCH transmission subframe have a fixed relationship based on the UL index. The usage of each UL index configuration is determined by dynamic subframe configuration. In the example illustrated in Tables 3A and 3B, if the dynamic subframe configuration indicates that either SF4 or SF9 is a UL subframe for a subsequent radio frame, then the first UL index configuration (e.g., Table 3A) may be used. On the other hand, if the dynamic subframe configuration indicates neither SF4 nor SF9 is a UL subframe for the subsequent radio frame, the second UL index configuration (e.g., Table 3B) may be used. For example, if the dynamic subframe configuration for the subsequent radio frame is subframe configuration #0 indicating SF4 as a UL subframe, the first UL index configuration (e.g., Table 3A) is used for subframe configuration #0. On the other hand, if the dynamic subframe configuration for the subsequent radio frame is subframe configuration #1 indicating that neither SF4 nor SF9 is a UL subframe, the second UL index configuration (e.g., Table 3B) may be used for subframe configuration #1. In addition, a one-bit field may be added in the dynamic subframe configuration to indicate which one of the first (e.g., Table 3A) and second (e.g., Table 3B) UL index configurations is used for the current frame. Additionally or in the Alternative, as an exception, if the reference subframe configuration is subframe configuration #0 and the dynamic subframe configuration is also subframe configuration #0, the 2-bit field may still be interpreted as the UL index. However, if the UE does not determine that the reference subframe configuration is subframe configuration #0 and the dynamic subframe configuration is also subframe configuration #0, the 2-bit field may be interpreted as UL DAI.

TABLE 3A

UL Index = 0 Configuration

| PDCCH UL Grant Subframe | PUSCH Subframe (UL index = 0) |
|---|---|
| SF0 | SF4 |
| SF1 | SF7 and SF8 |
| SF5 | SF9 |
| SF6 | SF2 and SF3 |

TABLE 3B

UL Index = 1 Configuration

| PDCCH UL Grant Subframe | PUSCH Subframe (UL index = 1) |
|---|---|
| SF0 | SF4 and SF7 |
| SF1 | SF8 |
| SF5 | SF9 and SF2 |
| SF6 | SF3 |

Additionally or in the alternative, the potential collision between the UL index and the UL DAI bits may be addressed using a second approach. According to the second approach, the UL index may be predetermined for each fixed subframe for the UL grant, where the UL index is fixed for an uplink subframe of a corresponding UL grant subframe. Because the UL index is predetermined for each fixed subframe for the UL grant, the UL index is not included in the DCI format 0/4 of the UL grant. Thus, the 2-bit field in the DCI format 0/4 may be used for the UL DAI bits.

In the example illustrated in Table 4 below, the UL index is predetermined for each fixed subframe for the UL grant, where subframes #0, 1, 5, and 6 are fixed DL subframes for both the DL and UL HARQ operations (and thus common to UEs). One of the UL index values (e.g., "01," "10," and "11") may be assigned for a UL grant subframe. A subframe corresponding to the assigned UL index may be a UL subframe. For example, in Table 4, a UL index of "01" is assigned for the UL grant subframe 1, and thus a PUSCH transmission in SF8 is scheduled for the UL grant subframe 1. A fixed UL index pattern may be predetermined to support multi-TTI scheduling for multiple subframes. For example, in Table 4, a fixed UL index of "11" is assigned for the UL grant subframe 0, and thus the PUSCH transmission in both SF4 and SF7 may be scheduled for the UL grant subframe 0. As another example, for the UL grant subframe 0 in Table 4, because each of SF4 and SF 7 is a flexible subframe that is either a DL subframe or a UL subframe depending on the subframe configuration, if SF4 is reconfigured as a DL subframe (e.g., according to a dynamic subframe configuration), then only SF7 may be scheduled for the PUSCH transmission. In addition, if the UE does not have information as to whether a subframe is a DL subframe or a UL subframe (e.g., due to a misdetection of reconfiguration signaling), the UE does not perform the PUSCH transmission in any flexible subframe to avoid any possible interference to other UEs.

TABLE 4

Fixed UL Index Configuration

| PDCCH UL Grant Subframe | PUSCH Subframe |
|---|---|
| SF0 | SF4 and SF7 (UL Index = 11) |
| SF1 | SF8 (UL Index = 01) |
| SF5 | SF9 and SF2 (UL Index = 11) |
| SF6 | SF3 (UL Index = 01) |

As discussed supra, if the UL grant transmission is based on UL HARQ reference subframe configuration, the DL subframe carrying DCI format 0/4 may not be in the last subframe of the DL association set. If the UL DAI bits in the DCI format 0/4 are not transmitted during any of the subframes in the DL association, there may be an issue with UL transmission. This issue can be resolved by a third approach using flexible UL grant timing. For fixed UL subframes (e.g., common UL subframes between DL and UL HARQ reference subframe configurations), the UL grant that is transmitted based on the UL HARQ reference subframe configuration may also be transmitted based on the DL HARQ reference subframe configuration. In particular, because a fixed UL subframe is used as a UL subframe in both the UL HARQ operation based on the UL HARQ reference subframe configuration and the DL HARQ operation based on the DL HARQ reference subframe configuration, the UL grant may be transmitted at the fixed UL subframe based on any one of the UL HARQ reference subframe configuration or the DL HARQ reference subframe configuration. Thus, the UL HARQ reference subframe configuration may not be used for fixed UL subframes, although the UL HARQ reference subframe configuration may be used for flexible UL subframes. According to the third approach, if a subframe with the smallest value of km in the DL association set (where km is a minimum delay between the PDCCH UL grant and the PUSCH transmission) is a DL subframe according to the DL HARQ reference subframe configuration, then the UE may receive a UL grant at the subframe with the smallest value of km for uplink at a corresponding UL subframe. It is noted that the subframe with the smallest value of km is the last subframe in the DL association set, as discussed supra.

Figure 11:
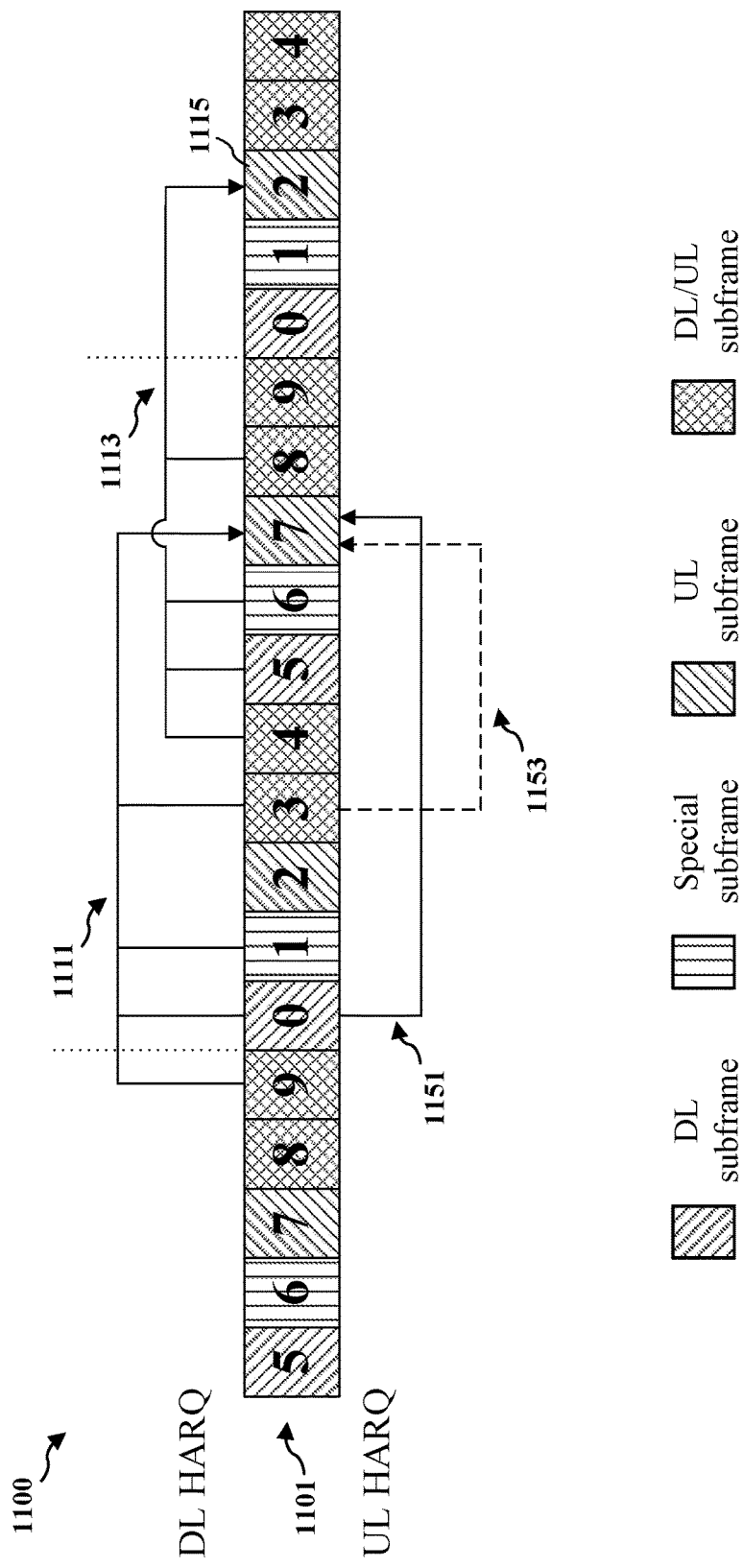
FIG. 11 is an example HARQ operation of a DL HARQ operation and a UL HARQ operation with subframes according to an embodiment of a disclosure.

FIG. 11 is an example HARQ operation 1100 of a DL HARQ operation and a UL HARQ operation with subframes 1101 according to an embodiment of a disclosure. In the example illustrated in FIG. 11, subframe configuration #2 (1115) is used as a DL subframe configuration and subframe configuration #6 is used as a UL subframe configuration. In FIG. 11, a first DL HARQ operation 1111 illustrates that the DL association set includes subframes #9, 0, 1, and 3 for UL at subframe #7, and the second DL HARQ operation 1113 illustrates that the DL association set includes subframes #4, 5, 6 and 8 for UL at subframe #2. Further, in FIG. 11, the first UL HARQ operation 1151 illustrates that the UE receives a first UL grant at subframe #0 for UL transmission at subframe #7, and the second UL HARQ operation 1153 illustrates that the UE receives a second UL grant at subframe #3 for UL transmission at subframe #7. According to the third approach, the UE receives the second UL grant at subframe #3 because subframe #3 is the last subframe of the DL association set for UL transmission at subframe #7. It is noted that subframe #3 is located subsequent to subframe #0 which is a fixed DL subframe.

The flexible UL grant timing for one or more fixed UL subframes can be either implicitly or explicitly determined. For the implicit method, the UE monitors a UL grant in both a DL subframe based on a DL reference subframe configuration and a DL subframe based on a UL reference subframe configuration. If the UE detects two UL grants for uplink transmission at a fixed UL subframe and there is inconsistency between the two UL grants, the UE considers the UL grant that is decoded last and may not consider the other UL grant. In the example illustrated in FIG. 11, a first UL grant is received at subframe #0 and a second UL grant is received at subframe #3, where the first UL grant and the second UL grant are for uplink transmission at subframe #7 that is a fixed UL subframe. In this example, if there is inconsistency between the first UL grant and the second UL grant, the UE considers the second UL grant received at subframe #3 for UL at subframe #7, which is the last decoded UL grant, and does not consider the first UL grant received at subframe #0. Alternatively, the explicit method may include an additional 1-bit indicator in a dynamic subframe configuration, such that the 1-bit indicator indicates which UL grant should be considered.

As discussed supra, an issue may arise when a subframe in which a UL grant is received is located before the last subframe of a DL association set. Accordingly, a fourth approach may be utilized to resolve such an issue. The value of a UL DAI bit in the DCI format 0/4 $V_{DAI}^{UL}$ represents a total number of scheduled DL subframes with PDSCH transmission in a DL association set. If the eNB does not use pre-scheduling, the UL DAI value $V_{DAI}^{UL}$ reflects a number of DL subframes up to a subframe in which the UL grant is received, and thus may be a smaller number than a total number of scheduled DL subframes in the DL association set. In case the UL DAI value $V_{DAI}^{UL}$ does not reflect a correct total number of scheduled DL subframes the DL association set, the UE may derive a new UL DAI value $V_{DAI}^{UL,new}$ to represent a correct total number of DL subframes by adding an offset K to $V_{DAI}^{UL}$, where K represents a number of available DL subframes after the subframe in which the UL grant is received. That is $V_{DAI}^{UL,new}=V_{DAI}^{UL}+K$. The UE may use $V_{DAI}^{UL,new}$ to determine HARQ-ACK parameters for transmission on PUSCH, in order to provide a correct total number of scheduled DL subframes. If the UE does not detect any DL assignment in the DL subframes after the subframe in which the UL grant is received, UE may generate NACK for those DL subframes.

Further, the DL association set may be divided into a first set of DL subframes and a second set of DL subframes. The first set of DL subframes includes DL subframes up to a subframe in which the UL grant is received in the DL association set. Thus, $V_{DAI}^{UL}$ represents a number of DL subframes in the first set. The second set of DL subframes includes available DL subframes after the subframe in which the UL grant is received in the DL association set. Thus, K represents a number of DL subframes in the second set. Determination of a HARQ-ACK payload size for the first set is based on the UL DAI value $V_{DAI}^{UL}$ received in the UL grant, and determination of a HARQ-ACK payload size for the second set is based on a number of the DL subframes in the second set, which is equal to the offset K. Subsequently, a feedback HARQ-ACK payload size for the DL association set may be determined by calculating a sum of the payload size of the first set and the payload size of the second set.

For example, referring back to FIG. 10, with regard to the DL HARQ timing, the first DL HARQ operation 1011 illustrates that the DL association set includes subframes #9, 0, 1, and 3 for UL at subframe #7. With regard to the UL HARQ timing, the first UL HARQ operation 1051 illustrates that the UE receives a UL grant at subframe #0 for UL at subframe #7. The UL DAI bit value $V_{DAI}^{UL}$ is two, for subframes #9 and 0 of the first DL HARQ operation 1011, because the UL DAI value $V_{DAI}^{UL}$ represents a number of DL subframes in the DL association set (e.g., the set including subframes #9, 0, 1, and 3) up to subframe #0 in which the UL grant is received in the first UL HARQ operation 1051. In this example, K is two for subframes #1 and 3 of the first DL HARQ operation 1011 because K represents a number of DL subframes in the DL association set (e.g., subframes #9, 0, 1, and 3) after subframe #0 in which the UL grant is received in the first UL HARQ operation 1051. In the example of FIG. 10, the new UL DAI value $V_{DAI}^{UL,new}$ is $V_{DAI}^{UL}+K=2+2=4$. Thus, even if the eNB does not use pre-scheduling for DL subframes (e.g., subframes #1 and 3) following the UL grant subframe (e.g., subframe #0) when transmitting the UL grant for UL at subframe #7, $V_{DAI}^{UL,new}=4$ is used to represent the correct total number of DL subframes (e.g., subframes #9, 0, 1, and 3).

Further, in FIG. 10, the first set of DL subframes including DL subframes up to subframe #0 in the DL association set includes subframes #9 and 0. The second set of DL subframes including available DL subframes after subframe #0 in the DL association set includes subframes #1 and 3. A HARQ-ACK payload size for the first set is determined based on the UL DAI value (e.g., $V_{DAI}^{UL}=2$). A HARQ-ACK payload size for the s set is determined based on a number of the DL subframes in the second set (e.g., K=2). A feedback HARQ-ACK payload size for the DL association set (e.g., subframes #9, 0, 1, and 3) may be determined by calculating a sum of the payload size of the first set (e.g., subframes #9 and 0) and the payload size of the second set (e.g., #1 and 3).

According to a fifth approach, UL HARQ-ACK transmission may not depend on UL DAI for UL HARQ-ACK feedback. For example, the UE may discard the UL DAI in a UL grant and perform HARQ-ACK transmission on PUSCH without the UL DAI. Thus, if the fifth approach is used, the issues related to the UL DAI bits can be avoided. In particular, for HARQ-ACK bundling, the UE determines the parameter $N_{bundled}$ from a number of assigned DL subframes in the DL association set (e.g., a size of the DL association set) detected by the UE. For HARQ-ACK multiplexing, the UE determines a HARQ-ACK codebook either by the size of the DL association set or by a size of the dynamic set excluding flexible UL subframes. The flexible UL subframes can be determined from dynamic subframe configurations. For example, referring back to FIG. 10, the dynamic set may exclude subframes #3, 4, 8, and 9 because subframes #3, 4, 8, and 9 in FIG. 10 are flexible UL subframes according to the UL/DL subframe configurations. It is noted that the first approach with the cell specific UL index configuration, the second approach with the predetermined UL index, the third approach using flexible UL grant timing, the fourth approach of determining a new UL DAI value by adding an offset to a UL DAI value, and the fifth approach via the UE may be used alone or in any combination thereof.

Figure 12:
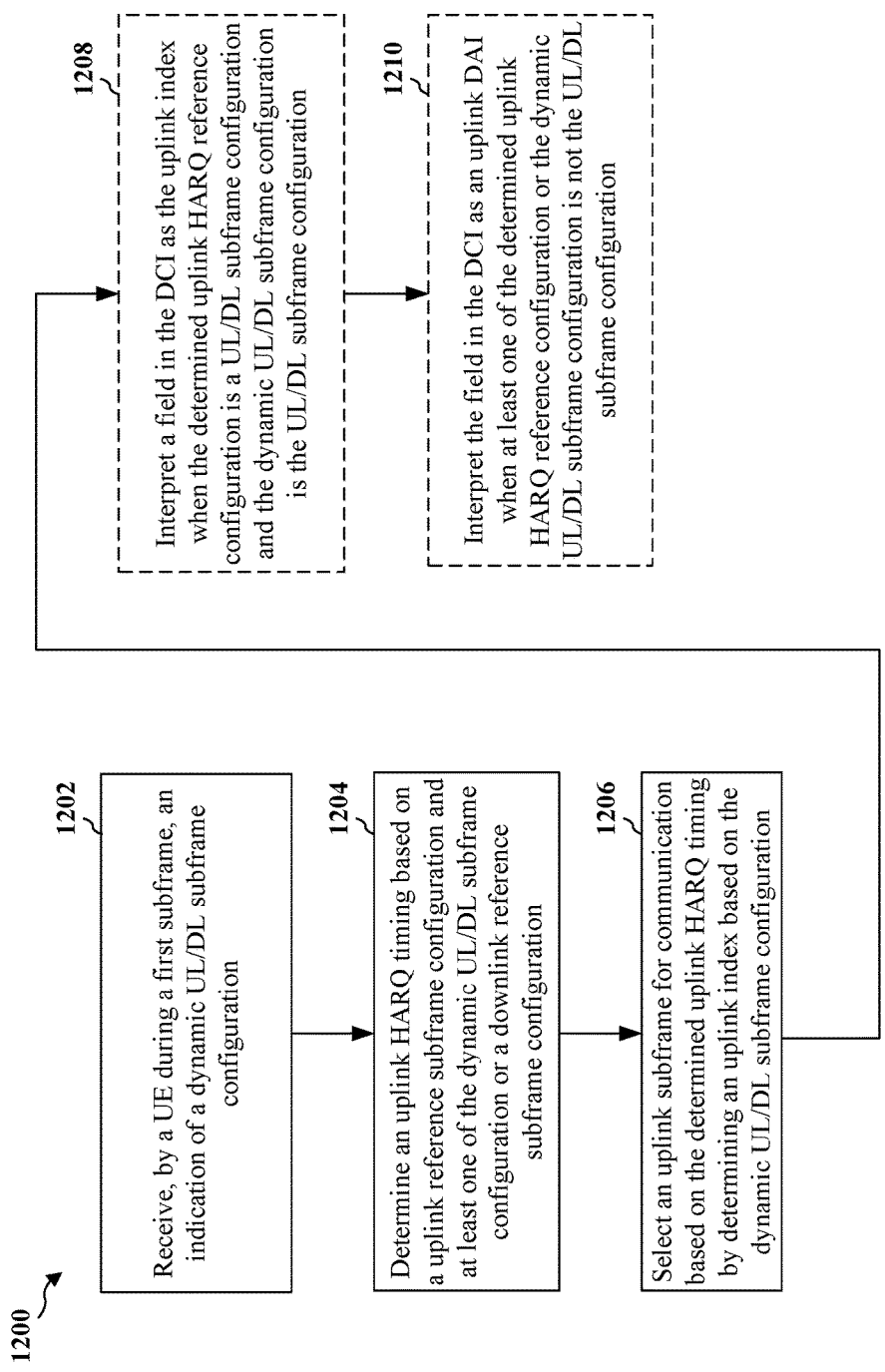
FIG. 12 is a flowchart of a first method of wireless communications in a TDD LTE based network.

FIG. 12 is a flowchart 1200 of a first method of wireless communications in a TDD LTE based network. The method may be performed by a UE. At step 1202, the UE receives, during a first subframe, an indication of a dynamic UL/DL subframe configuration. At step 1204, the UE determines an uplink HARQ timing based on an uplink reference subframe configuration and at least one of the dynamic UL/DL subframe configuration or a downlink reference subframe configuration. At step 1206, the UE selects an uplink subframe for communication based on the determined uplink HARQ timing by determining an uplink index based on the dynamic UL/DL subframe configuration, where the uplink subframe is selected based on the uplink index. The uplink index may be a first value when the dynamic UL/DL subframe configuration indicates one or more subframe numbers are associated with a subframe for uplink, and the uplink index may be a second value when the dynamic UL/DL subframe configuration indicates the one or more subframe numbers are not associated with the subframe for uplink. As discussed supra, the UE determines an uplink HARQ timing based on the UL reference subframe configuration and a dynamic UL/DL subframe configuration. For example, as discussed supra, according to the examples illustrated in Tables 3A and 3B where subframe configuration #0 is used as the UL HARQ reference subframe configuration, if the dynamic subframe configuration indicates that either SF4 or SF9 is a UL subframe for a subsequent radio frame, then the first UL index configuration (e.g. Table 3A) is used, and if the dynamic subframe configuration indicates that neither of SF4 nor SF9 is a UL subframe for the subsequent radio frame, the second UL index configuration (e.g. Table 3B) is used. Tables 3A and 3B illustrate the UL HARQ timing according to the UL index. In particular, according to the examples illustrated in Tables 3A and 3B, the PUSCH subframe is selected based on the UL index.

In an optional aspect at step 1208, the UE may interpret a field in the DCI as the uplink index when the determined uplink HARQ reference configuration is a UL/DL subframe configuration and the dynamic UL/DL subframe configuration is the UL/DL subframe configuration. In an optional aspect at step 1210, the UE may interpret the field in the DCI as an uplink DAI when at least one of the determined uplink HARQ reference configuration or the dynamic UL/DL subframe configuration is not the UL/DL subframe configuration. As discussed supra, for example, if the reference subframe configuration is subframe configuration #0 and the dynamic subframe configuration is also subframe configuration #0, the 2-bit field may still be interpreted as the UL index. Further, as discussed supra, if the UE does not determine that the reference subframe configuration is subframe configuration #0 and the dynamic subframe configuration is also subframe configuration #0, the 2-bit field may be interpreted as UL DAI.

Figure 13:
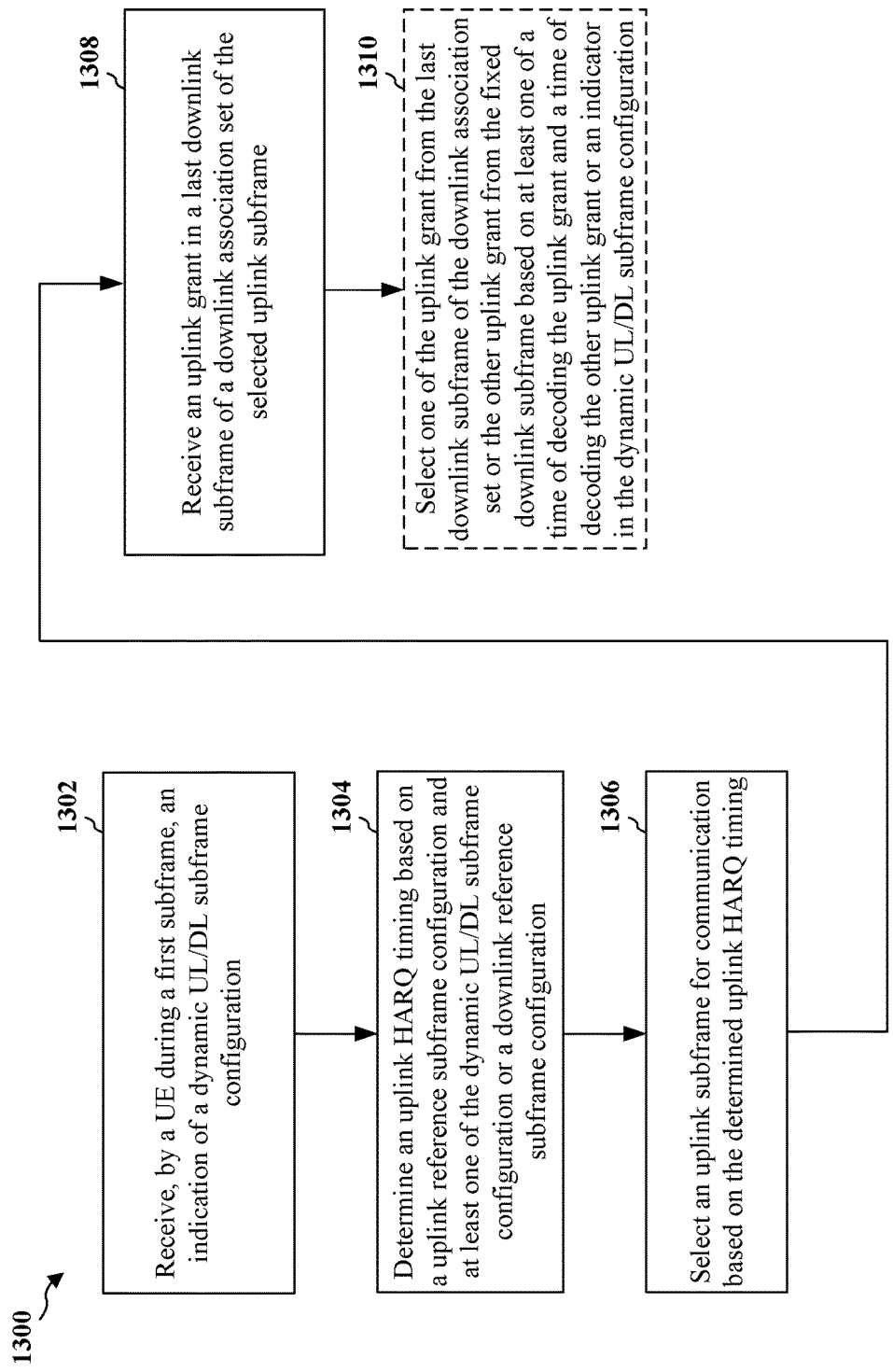
FIG. 13 is a flowchart of a second method of wireless communications in a TDD LTE based network.

FIG. 13 is a flowchart 1300 of a second method of wireless communications in a TDD LTE based network. The method may be performed by a UE. At step 1302, the UE receives, during a first subframe, an indication of a dynamic UL/DL subframe configuration. At step 1304, the UE determines an uplink HARQ timing based on an uplink reference subframe configuration and at least one of the dynamic UL/DL subframe configuration or a downlink reference subframe configuration. At step 1306, the UE selects an uplink subframe for communication based on the determined uplink HARQ timing. At step 1308, the UE receives an uplink grant in a last downlink subframe of a downlink association set of the selected uplink subframe. The last downlink subframe may be determined based on the downlink reference subframe configuration. The last downlink subframe of the downlink association set may be located subsequent to a fixed downlink subframe used to receive another uplink grant. As discussed supra, the UE determines the uplink HARQ timing based on the UL reference subframe configuration and the DL reference subframe configuration. If a subframe with the smallest value of km in the DL association set is a DL subframe according to the DL HARQ reference subframe configuration, then the UE may receive a UL grant at the subframe with the smallest value of km for uplink at a corresponding UL subframe, where the subframe with the smallest value of km is the last subframe in the DL association set. For example, as discussed supra, referring to the example illustrated in FIG. 11, the UE receives the second UL grant at subframe #3 because subframe #3 is the last subframe of the DL association set for UL transmission at subframe #7, and because subframe #3 is located subsequent to subframe #0, which is a fixed DL subframe.

In an optional aspect at step 1310, the UE may select one of the uplink grant from the last downlink subframe of the downlink association set or the other uplink grant from the fixed downlink subframe based on at least one of a time of decoding the uplink grant and a time of decoding the other uplink grant or an indicator in the dynamic UL/DL subframe configuration. The last downlink subframe of the downlink association set may be a flexible downlink subframe. As discussed supra, for example, referring to FIG. 11, if there is inconsistency between the first UL grant received at subframe #0 and the second UL grant received at subframe #3, the UE considers the second UL grant received at subframe #3 for UL at subframe #7, which is the last decoded UL grant, and does not consider the first UL grant received at subframe #0. Alternatively, as discussed supra, a dynamic subframe configuration may include an additional 1-bit indicator that indicates which UL grant should be considered.

Figure 14:
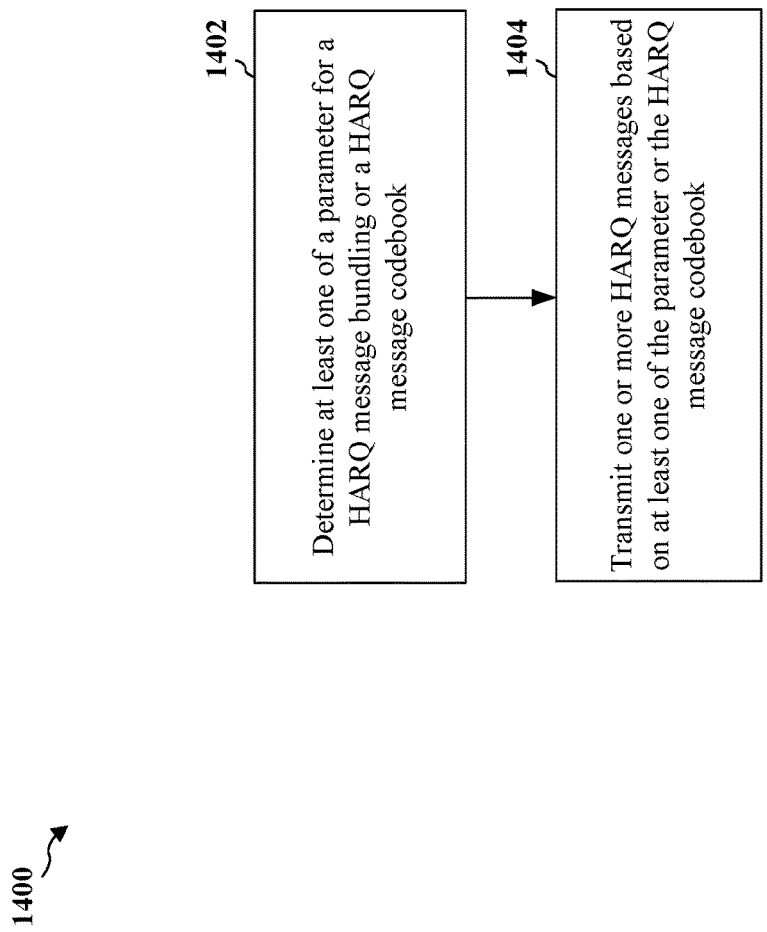
FIG. 14 is a flowchart of a third method of wireless communications in a TDD LTE based network.

FIG. 14 is a flowchart 1400 of a third method of wireless communications in a TDD LTE based network. The method may be performed by a UE. At step 1402, the UE determines at least one of a parameter for a HARQ message bundling or a HARQ message codebook. At step 1404, the UE transmits one or more HARQ messages based on at least one of the parameter or the HARQ message codebook. The one or more flexible uplink subframes may be determined from a dynamic uplink/downlink subframe configuration. For example, as discussed supra, for HARQ-ACK bundling, the UE determines the parameter $N_{bundled}$ from a number of assigned DL subframes in the DL association set detected by the UE. As discussed supra, for HARQ-ACK multiplexing, the UE determines a HARQ-ACK codebook either by the size of the DL association set or by a size of the dynamic set excluding flexible UL subframes.

Figure 15:
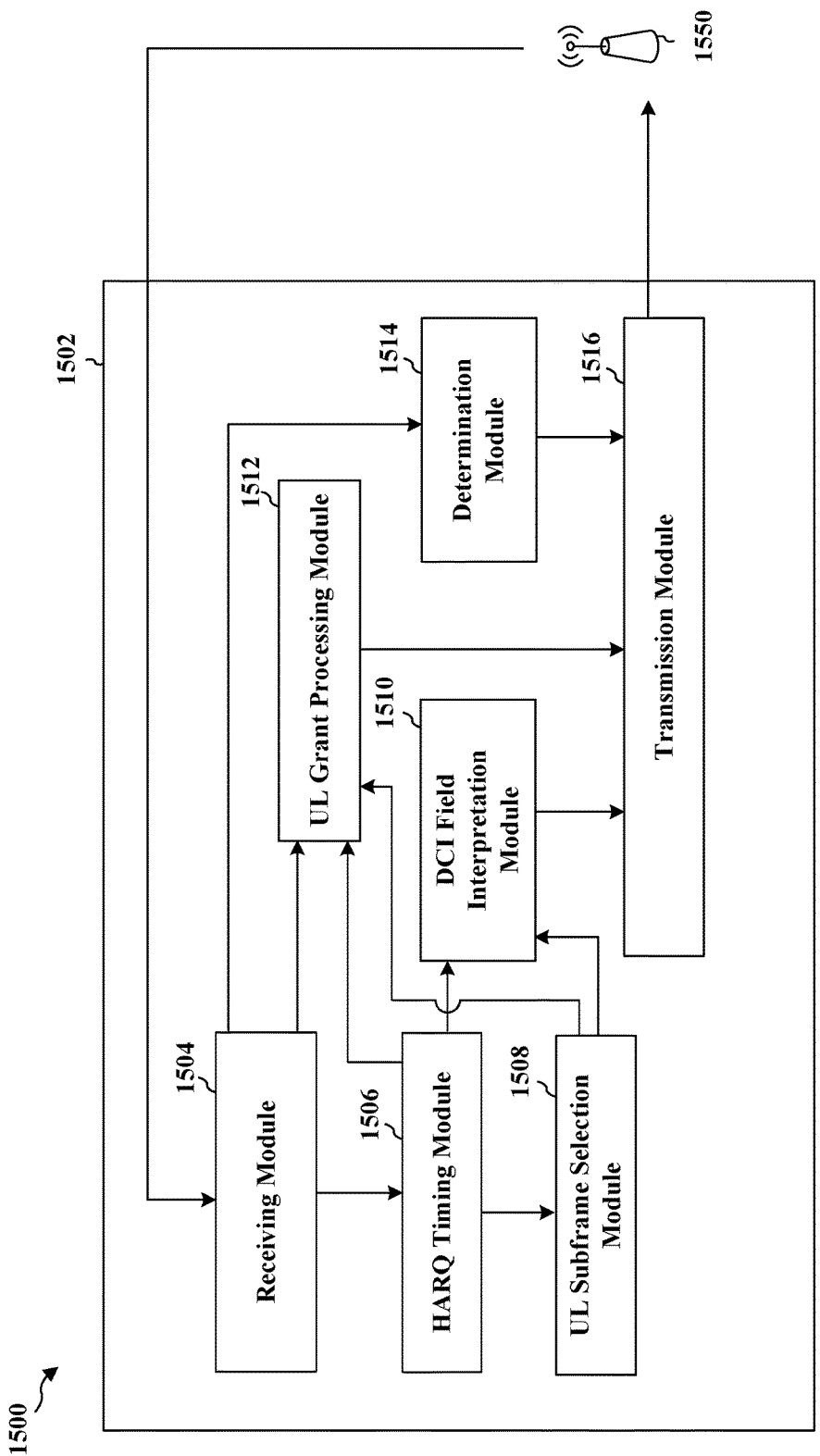
FIG. 15 is a conceptual data flow diagram illustrating the data flow between different modules/means/components in an example apparatus.

FIG. 15 is a conceptual data flow diagram 1500 illustrating the data flow between different modules/means/components in an example apparatus 1502. The apparatus may be a UE. The apparatus includes a receiving module 1504, a HARQ timing module 1506, a UL subframe selection module 1508, a DCI field interpretation module 1510, a UL grant processing module 1512, a determination module 1514, and a transmission module 1516. The receiving module 1504 receives, during a first subframe, an indication of a dynamic UL/DL subframe configuration. The HARQ timing module 1506 determines an uplink HARQ timing based on a uplink reference subframe configuration and at least one of the dynamic UL/DL subframe configuration or a downlink reference subframe configuration. The UL subframe selection module 1508 selects an uplink subframe for communication based on the determined uplink HARQ timing by determining an uplink index based on the dynamic UL/DL subframe configuration. The DCI field interpretation module 1510 interprets a field in the DCI as the uplink index when the determined uplink HARQ reference configuration is a UL/DL subframe configuration and the dynamic UL/DL subframe configuration is the UL/DL subframe configuration, and interprets the field in the DCI as an uplink DAI when at least one of the determined uplink HARQ reference configuration or the dynamic UL/DL subframe configuration is not the UL/DL subframe configuration.

The UL grant processing module 1512 receives, via the receiving module 1504, an uplink grant in a last downlink subframe of a downlink association set of the selected uplink subframe, where the last downlink subframe is determined based on the downlink reference subframe configuration. The UL grant processing module 1512 select one of the uplink grant from the uplink subframe or the other uplink grant from the fixed downlink subframe based on at least one of a time of decoding the uplink grant and a time of decoding the other uplink grant or an indicator in the dynamic UL/DL subframe configuration.

The determination module 1514 determines at least one of a parameter for a HARQ message bundling or a HARQ message codebook, where the parameter for the HARQ message bundling is determined based on a size of a downlink association set of subframes detected by a user equipment, and the HARQ message codebook is determined based on at least one of the size of the downlink association set of subframes or a size of a dynamic set of subframes excluding one or more flexible uplink subframes. The transmission module 1516 transmits one or more HARQ messages based on at least one of the parameter or the HARQ message codebook.

The apparatus may include additional modules that perform each of the steps of the algorithm in the aforementioned flow charts of FIGS. 12-14. As such, each step in the aforementioned flow charts of FIGS. 12-14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
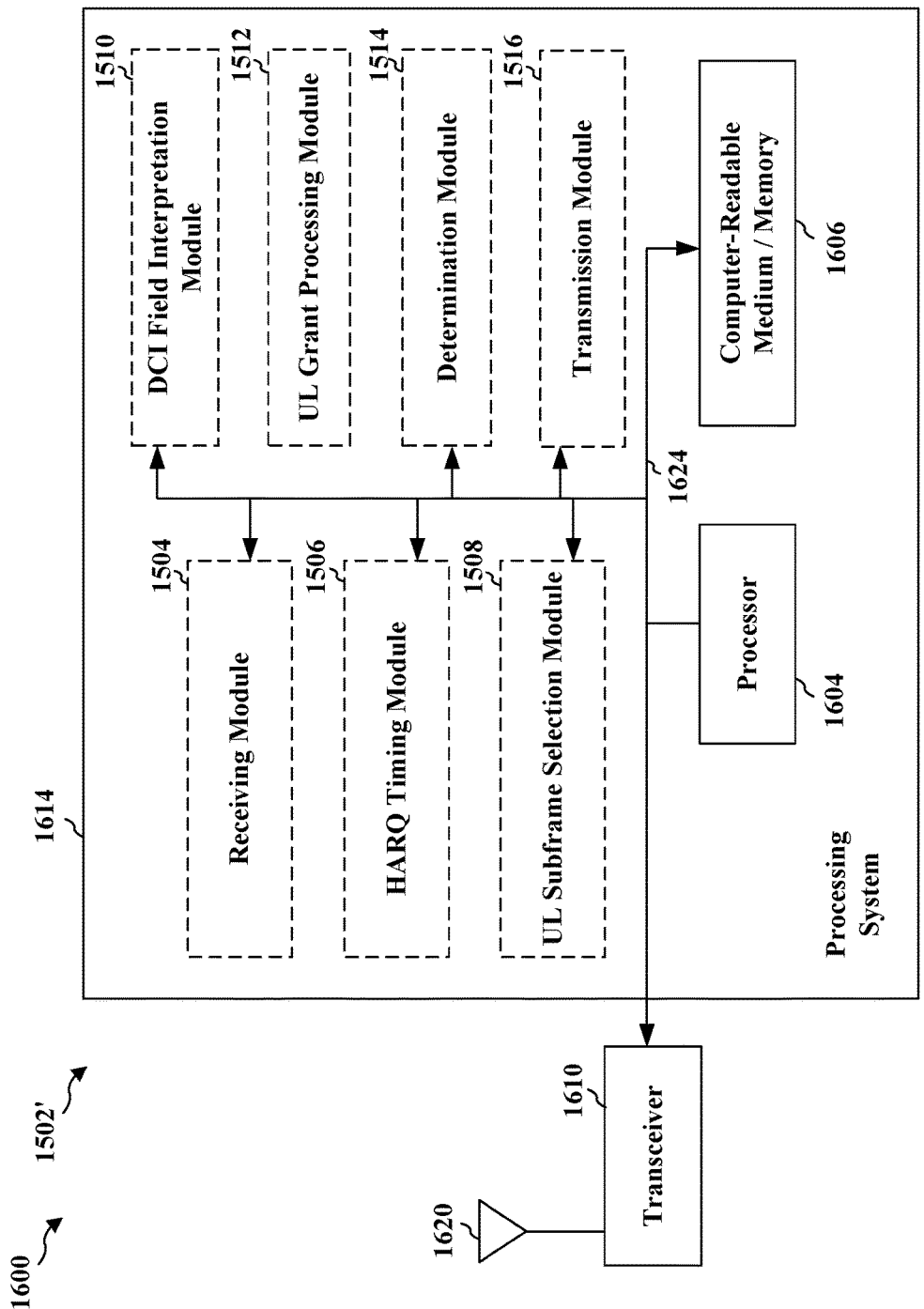
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1504, 1506, 1508, 1510, 1512, 1514, 1516, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the receiving module 1504. In addition, the transceiver 1610 receives information from the processing system 1614, specifically the transmission module 1516, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system further includes at least one of the modules 1504, 1506, 1508, 1510, 1512, 1514, and 1516. The modules may be software modules running in the processor 1604, resident/stored in the computer readable medium/memory 1606, one or more hardware modules coupled to the processor 1604, or some combination thereof. The processing system 1614 may be a component of the UE 650 and may include the memory 660 and/or at least one of the TX processor 668, the RX processor 656, and the controller/processor 659.

In one configuration, the apparatus 1502/1502' for wireless communication includes means for receiving, by a user equipment (UE) during a first subframe, an indication of a dynamic uplink/downlink (UL/DL) subframe configuration, means for determining an uplink hybrid automatic repeat request (HARQ) timing based on an uplink reference subframe configuration and at least one of the dynamic UL/DL subframe configuration or a downlink reference subframe configuration, and means for selecting an uplink subframe for communication based on the determined uplink HARQ timing. The means for selecting is further configured to determine an uplink index based on the dynamic UL/DL subframe configuration, wherein the uplink subframe is selected based on the uplink index. The uplink index may be a first value when the dynamic UL/DL subframe configuration indicates one or more subframe numbers are associated with a subframe for uplink, and the uplink index may be a second value when the dynamic UL/DL subframe configuration indicates the one or more subframe numbers are not associated with the subframe for uplink. The means for receiving may be further configured to receive downlink control information (DCI), and the apparatus 1502/1502' may further include means for interpreting a field in the DCI as the uplink index when the determined uplink HARQ reference configuration is a UL/DL subframe configuration and the dynamic UL/DL subframe configuration is the UL/DL subframe configuration, and means for interpreting the field in the DCI as an uplink DAI when at least one of the determined uplink HARQ reference configuration or the dynamic UL/DL subframe configuration is not the UL/DL subframe configuration.

The apparatus 1502/1502' may further include means for receiving an uplink grant in a last downlink subframe of a downlink association set of the selected uplink subframe, where the last downlink subframe is determined based on the downlink reference subframe configuration. The last downlink subframe of the downlink association set may be located subsequent to a fixed downlink subframe used to receive another uplink grant. The apparatus 1502/1502' may further include means for selecting one of the uplink grant from the uplink subframe or the other uplink grant from the fixed downlink subframe based on at least one of a time of decoding the uplink grant and a time of decoding the other uplink grant, or an indicator in the dynamic UL/DL subframe configuration.

In another configuration, the apparatus 1502/1502' for wireless communication includes means for determining at least one of a parameter for a hybrid automatic repeat request (HARQ) message bundling or a HARQ message codebook, where the parameter for the HARQ message bundling is determined based on a size of a downlink association set of subframes detected by a user equipment, and the HARQ message codebook is determined based on at least one of the size of the downlink association set of subframes or a size of a dynamic set of subframes excluding one or more flexible uplink subframes, and means for transmitting one or more HARQ messages based on at least one of the parameter or the HARQ message codebook. The one or more flexible uplink subframes may be determined from a dynamic uplink/downlink subframe configuration.

The aforementioned means may be one or more of the aforementioned modules of the apparatus 1502 and/or the processing system 1614 of the apparatus 1502' configured to perform the functions recited by the aforementioned means. As described supra, the processing system 1614 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications in a time division duplex (TDD) based network, comprising:
   receiving, by a user equipment (UE) during a first subframe, an indication of a dynamic uplink/downlink (UL/DL) subframe configuration and downlink control information (DCI);
   determining an uplink hybrid automatic repeat request (HARQ) timing based on an uplink reference subframe configuration and at least one of the dynamic UL/DL subframe configuration, a predetermined uplink index, or a downlink reference subframe configuration;
   interpreting a field in the DCI as an uplink index when the uplink reference subframe configuration is a UL/DL subframe configuration and the dynamic UL/DL subframe configuration is the UL/DL subframe configuration;
   interpreting the field in the DCI as an uplink downlink assignment index (DAI) when at least one of the uplink reference subframe configuration or the dynamic UL/DL subframe configuration is not the UL/DL subframe configuration; and
   selecting an uplink subframe for communication by determining the uplink index based on the dynamic UL/DL subframe configuration, wherein the uplink subframe is selected based on the determined uplink HARQ timing and the uplink index.

2. The method of claim 1, wherein the uplink index is a first value when the dynamic UL/DL subframe configuration indicates one or more subframe numbers are associated with a subframe for uplink, and the uplink index is a second value when the dynamic UL/DL subframe configuration indicates the one or more subframe numbers are not associated with the subframe for uplink.

3. A method of wireless communications in a time division duplex (TDD) based network, comprising:
   receiving, by a user equipment (UE) during a first subframe, an indication of a dynamic uplink/downlink (UL/DL) subframe configuration;
   determining an uplink hybrid automatic repeat request (HARQ) timing based on an uplink reference subframe configuration and at least one of the dynamic UL/DL subframe configuration, a predetermined uplink index, or a downlink reference subframe configuration, wherein the predetermined uplink index is assigned for a fixed downlink subframe in which the UE receives an uplink grant;

determining an uplink subframe for the fixed downlink subframe based on the predetermined uplink index; and selecting an uplink subframe for communication based on the determined uplink HARQ timing.

4. A method of wireless communications in a time division duplex (TDD) based network, comprising:

receiving, by a user equipment (UE) during a first subframe, an indication of a dynamic uplink/downlink (UL/DL) subframe configuration;

determining an uplink hybrid automatic repeat request (HARQ) timing based on an uplink reference subframe configuration and at least one of the dynamic UL/DL subframe configuration, a predetermined uplink index, or a downlink reference subframe configuration;

selecting an uplink subframe for communication based on the determined uplink HARQ timing; and receiving an uplink grant in a last downlink subframe of a downlink association set of the selected uplink subframe, wherein the last downlink subframe is determined based on the downlink reference subframe configuration.

5. The method of claim 4, wherein the last downlink subframe of the downlink association set is located subsequent to a fixed downlink subframe used to receive another uplink grant.

6. The method of claim 5, further comprising:

selecting one of the uplink grant from the last downlink subframe of the downlink association set or the other uplink grant from the fixed downlink subframe based on at least one of:
   a time of decoding the uplink grant and a time of decoding the other uplink grant, or an indicator in the dynamic UL/DL subframe configuration.

7. An apparatus for wireless communications in a time division duplex (TDD) based network, comprising:

means for receiving, by a user equipment (UE) during a first subframe, an indication of a dynamic uplink/downlink (UL/DL) subframe configuration and downlink control information (DCI);

means for determining an uplink hybrid automatic repeat request (HARQ) timing based on an uplink reference subframe configuration and at least one of the dynamic UL/DL subframe configuration, a predetermined uplink index, or a downlink reference subframe configuration;

means for interpreting a field in the DCI as an uplink index when the uplink reference subframe configuration is a UL/DL subframe configuration and the dynamic UL/DL subframe configuration is the UL/DL subframe configuration; and means for interpreting the field in the DCI as an uplink downlink assignment index (DAI) when at least one of the uplink reference subframe configuration or the dynamic UL/DL subframe configuration is not the UL/DL subframe configuration; and means for selecting an uplink subframe for communication by determining the uplink index based on the dynamic UL/DL subframe configuration, wherein the uplink subframe is selected based on the determined uplink HARQ timing and the uplink index.

8. The apparatus of claim 7, wherein the uplink index is a first value when the dynamic UL/DL subframe configuration indicates one or more subframe numbers are associated with a subframe for uplink, and the uplink index is a second value when the dynamic UL/DL subframe configuration indicates the one or more subframe numbers are not associated with the subframe for uplink.

9. An apparatus for wireless communications in a time division duplex (TDD) based network, comprising:

means for receiving, by a user equipment (UE) during a first subframe, an indication of a dynamic uplink/downlink (UL/DL) subframe configuration;

means for determining an uplink hybrid automatic repeat request (HARQ) timing based on an uplink reference subframe configuration and at least one of the dynamic UL/DL subframe configuration, a predetermined uplink index, or a downlink reference subframe configuration, wherein the predetermined uplink index is assigned for a fixed downlink subframe in which the UE receives an uplink grant;

means for determining an uplink subframe for the fixed downlink subframe based on the predetermined uplink index; and means for selecting an uplink subframe for communication based on the determined uplink HARQ timing.

10. An apparatus for wireless communications in a time division duplex (TDD) based network, comprising:

means for receiving, by a user equipment (UE) during a first subframe, an indication of a dynamic uplink/downlink (UL/DL) subframe configuration;

means for determining an uplink hybrid automatic repeat request (HARQ) timing based on an uplink reference subframe configuration and at least one of the dynamic UL/DL subframe configuration, a predetermined uplink index, or a downlink reference subframe configuration;

means for selecting an uplink subframe for communication based on the determined uplink HARQ timing; and means for receiving an uplink grant in a last downlink subframe of a downlink association set of the selected uplink subframe, wherein the last downlink subframe is determined based on the downlink reference subframe configuration.

11. The apparatus of claim 10, wherein the last downlink subframe of the downlink association set is located subsequent to a fixed downlink subframe used to receive another uplink grant.

12. The apparatus of claim 11, further comprising:

means for selecting one of the uplink grant from the last downlink subframe of the downlink association set or the other uplink grant from the fixed downlink subframe based on at least one of:
   a time of decoding the uplink grant and a time of decoding the other uplink grant, or an indicator in the dynamic UL/DL subframe configuration.

13. An apparatus for wireless communications in a time division duplex (TDD) based network, comprising:

a memory; and least one processor coupled to the memory and configured to:

receive, by a user equipment (UE) during a first subframe, an indication of a dynamic uplink/downlink (UL/DL) subframe configuration and downlink control information (DCI);

determine an uplink hybrid automatic repeat request (HARQ) timing based on an uplink reference subframe configuration and at least one of the dynamic UL/DL subframe configuration, a predetermined uplink index, or a downlink reference subframe configuration;

interpret a field in the DCI as an uplink index when the uplink reference subframe configuration is a UL/DL subframe configuration and the dynamic UL/DL subframe configuration is the UL/DL subframe configuration;

interpret the field in the DCI as an uplink downlink assignment index (DAI) when at least one of the uplink reference subframe configuration or the dynamic UL/DL subframe configuration is not the UL/DL subframe configuration; and select an uplink subframe for communication by determining the uplink index based on the dynamic UL/DL subframe configuration based on the determined uplink HARQ timing and the uplink index.

14. The apparatus of claim 13, wherein the uplink index is a first value when the dynamic UL/DL subframe configuration indicates one or more subframe numbers are associated with a subframe for uplink, and the uplink index is a second value when the dynamic UL/DL subframe configuration indicates the one or more subframe numbers are not associated with the subframe for uplink.

15. An apparatus for wireless communications in a time division duplex (TDD) based network, comprising:
a memory; and
least one processor coupled to the memory and configured to:
receive, by a user equipment (UE) during a first subframe, an indication of a dynamic uplink/downlink (UL/DL) subframe configuration;
determine an uplink hybrid automatic repeat request (HARQ) timing based on an uplink reference subframe configuration and at least one of the dynamic UL/DL subframe configuration, a predetermined uplink index, or a downlink reference subframe configuration, wherein the predetermined uplink index is assigned for a fixed downlink subframe in which the UE receives an uplink grant;
determine an uplink subframe for the fixed downlink subframe based on the predetermined uplink index; and
select an uplink subframe for communication based on the determined uplink HARQ timing.

16. An apparatus for wireless communications in a time division duplex (TDD) based network, comprising:
a memory; and
least one processor coupled to the memory and configured to:
receive, by a user equipment (UE) during a first subframe, an indication of a dynamic uplink/downlink (UL/DL) subframe configuration;
determine an uplink hybrid automatic repeat request (HARQ) timing based on an uplink reference subframe configuration and at least one of the dynamic UL/DL subframe configuration, a predetermined uplink index, or a downlink reference subframe configuration;
select an uplink subframe for communication based on the determined uplink HARQ timing; and
receive an uplink grant in a last downlink subframe of a downlink association set of the selected uplink subframe, wherein the last downlink subframe is determined based on the downlink reference subframe configuration.

17. The apparatus of claim 16, wherein the last downlink subframe of the downlink association set is located subsequent to a fixed downlink subframe used to receive another uplink grant.

18. The apparatus of claim 17, wherein the at least one processor is further configured to:

select one of the uplink grant from the last downlink subframe of the downlink association set or the other uplink grant from the fixed downlink subframe based on at least one of:
a time of decoding the uplink grant and a time of decoding the other uplink grant, or an indicator in the dynamic UL/DL subframe configuration.

19. A non-transitory computer-readable medium storing computer executable code for wireless communications in a time division duplex (TDD) based network, comprising code for:
receiving, by a user equipment (UE) during a first subframe, an indication of a dynamic uplink/downlink (UL/DL) subframe configuration and downlink control information (DCI); determining an uplink hybrid automatic repeat request (HARD) timing based on an uplink reference subframe configuration and at least one of the dynamic UL/DL subframe configuration, a predetermined uplink index, or a downlink reference subframe configuration;
interpreting a field in the DCI as an uplink index when the uplink reference subframe configuration is a UL/DL subframe configuration and the dynamic UL/DL subframe configuration is the UL/DL subframe configuration;
interpreting the field in the DCI as an uplink downlink assignment index (DAI) when at least one of the uplink reference subframe configuration or the dynamic UL/DL subframe configuration is not the UL/DL subframe configuration; and
selecting an uplink subframe for communication by determining the uplink index based on the dynamic UL/DL subframe configuration, wherein the uplink subframe is selected based on the determined uplink HARQ timing and the uplink index.

20. The non-transitory computer-readable medium of claim 19, wherein the uplink index is a first value when the dynamic UL/DL subframe configuration indicates one or more subframe numbers are associated with a subframe for uplink, and the uplink index is a second value when the dynamic UL/DL subframe configuration indicates the one or more subframe numbers are not associated with the subframe for uplink.

21. A non-transitory computer-readable medium storing computer executable code for wireless communications in a time division duplex (TDD) based network, comprising code for:
receiving, by a user equipment (UE) during a first subframe, an indication of a dynamic uplink/downlink (UL/DL) subframe configuration; and
determining an uplink hybrid automatic repeat request (HARQ) timing based on an uplink reference subframe configuration and at least one of the dynamic UL/DL subframe configuration, a predetermined uplink index, or a downlink reference subframe configuration, wherein the predetermined uplink index is assigned for a fixed downlink subframe in which the UE receives an uplink grant;
determining an uplink subframe for the fixed downlink subframe based on the predetermined uplink index; and
selecting an uplink subframe for communication based on the determined uplink HARQ timing.

22. A non-transitory computer-readable medium storing computer executable code for wireless communications in a time division duplex (TDD) based network, comprising code for:

receiving, by a user equipment (UE) during a first subframe, an indication of a dynamic uplink/downlink (UL/DL) subframe configuration;

determining an uplink hybrid automatic repeat request (HARQ) timing based on an uplink reference subframe configuration and at least one of the dynamic UL/DL subframe configuration, a predetermined uplink index, or a downlink reference subframe configuration;

selecting an uplink subframe for communication based on the determined uplink HARQ timing; and receiving an uplink grant in a last downlink subframe of a downlink association set of the selected uplink subframe, wherein the last downlink subframe is determined based on the downlink reference subframe configuration.

23. The non-transitory computer-readable medium of claim 22, wherein the last downlink subframe of the downlink association set is located subsequent to a fixed downlink subframe used to receive another uplink grant.

24. The non-transitory computer-readable medium of claim 23, further comprising:

selecting one of the uplink grant from the last downlink subframe of the downlink association set or the other uplink grant from the fixed downlink subframe based on at least one of:

a time of decoding the uplink grant and a time of decoding the other uplink grant, or an indicator in the dynamic UL/DL subframe configuration.

* * * * *